United States Patent [19]
Hiraoka et al.

[11] Patent Number: 5,893,783
[45] Date of Patent: Apr. 13, 1999

[54] OUTBOARD MOTOR EXHAUST SYSTEM

[75] Inventors: Noriyoshi Hiraoka; Masanori Takahashi; Atsushi Isogawa, all of Hamamatsu, Japan

[73] Assignee: Sanshin Kogyo Kabushiki Kaisha, Hamamatsu, Japan

[21] Appl. No.: 08/857,016

[22] Filed: May 15, 1997

[30] Foreign Application Priority Data

| May 30, 1996 | [JP] | Japan | 8-136146 |
| May 15, 1996 | [JP] | Japan | 8-119947 |
| May 28, 1996 | [JP] | Japan | 8-133250 |

[51] Int. Cl.⁶ .................................................. B63H 21/38
[52] U.S. Cl. .......................... 440/88; 60/323; 123/41.08; 123/179.25; 440/89
[58] Field of Search ............... 440/88, 89; 60/272, 60/312, 313, 320, 321, 323; 123/179.25, 196 W, 41.01, 41.08, 41.82 R

[56] References Cited

U.S. PATENT DOCUMENTS

| 3,431,882 | 3/1969 | Irgens | 440/89 |
| 3,994,129 | 11/1976 | Sakurai et al. | 60/323 |
| 4,787,344 | 11/1988 | Okumura et al. | 123/65 PE |
| 4,951,465 | 8/1990 | Torigai | 60/323 |
| 5,003,934 | 4/1991 | Gubon et al. | 60/323 |
| 5,109,809 | 5/1992 | Fjuimoto | 123/41.08 |
| 5,476,402 | 12/1995 | Nakai et al. | 440/88 |
| 5,752,866 | 5/1998 | Takahashi et al. | 440/88 |
| 5,803,023 | 9/1998 | Takahashi et al. | 440/88 |

*Primary Examiner*—Sherman Basinger
*Attorney, Agent, or Firm*—Knobbe, Martens, Olson & Bear LLP

[57] ABSTRACT

An exhaust system for an outboard motor powered by an internal combustion engine is disclosed. Preferably, the engine is of the "V"-type, having first and second banks defined by first and second cylinder heads connected to a cylinder block. Each bank contains at least one combustion chamber, and the banks define a valley extending therebetween along a length of the engine. A main exhaust passage is defined through each cylinder head generally within the valley, and an exhaust passage extends from each combustion chamber of a bank to the main exhaust passage of that bank. The main exhaust passages of the two banks join into a single passage.

12 Claims, 33 Drawing Sheets

OUTBOARD MOTOR EXHAUST SYSTEM

FIELD OF THE INVENTION

The present invention relates to an engine of the type utilized to power an outboard motor. More particularly, the invention is an exhaust system for a "V"-type engine.

BACKGROUND OF THE INVENTION

Outboard motors which are used to propel watercraft are positioned at the stern of the watercraft, generally attached to the transom. These motors comprise a cowling in which is positioned an internal combustion engine. The engine is arranged to drive a water propulsion device of the motor, such as a propeller.

The motor is connected to the watercraft in a manner which permits the motor to turn from side-to-side about a vertically extending axis for use in steering the watercraft. In addition, the motor is tiltable about a generally horizontal axis for use in trimming the motor.

Because the motor is movably mounted to the craft, it is desirable for the motor to be as small as practical. If the motor extends far beyond the rear of the watercraft, its center of gravity is far offset from the horizontal axis about which it tilts, making it very difficult to tilt the motor. In addition, moving the center of gravity of the motor far from the stern of the watercraft affects the dynamics of the watercraft.

To make the motor small, the cowling in which the engine is positioned is small. This requires the engine to be small to fit within the cowling. The tight confines within the cowling have resulted in past engine designs suffering from several drawbacks.

In general, these engines are arranged so that its crankshaft extends vertically and in driving relation with a vertically extending drive shaft. The drive shaft drives the propulsion device of the motor. The drive shaft can only be positioned so close to the end of the watercraft. That portion of the engine opposite the crankshaft then extends outwardly in the direction opposite the watercraft.

In order to reduce the distance between the rear end of the engine and the crankshaft, the features of the engine may be made smaller. For example, the size of the exhaust pipe extending along the rear end of the engine may be reduced. This, unfortunately, reduces engine performance.

In addition, with the engine so compactly arranged to fit within the cowling, heat build-up often affects the lubricating system. This is especially true when the lubricant path(s) and exhaust passage must be located near one another in the small areas within the cowling which the remainder of the engine does not occupy.

An improved exhaust system arrangement for an outboard motor powered by an internal combustion engine is desired.

SUMMARY OF THE INVENTION

In accordance with the present invention, there is provided an improved exhaust system for an outboard motor powered by an internal combustion engine. In general, the exhaust system is arranged so that the motor remains small and yet exhaust flow is not inhibited and the lubricating system for the engine is not undesirably affected.

Preferably, the engine with which the exhaust system is utilized is of the "V" type, having first bank and second banks each defined by a cylinder head connected to a cylinder block. Each bank contains at least one combustion chamber, and the banks define a valley therebetween.

In a first embodiment, a main exhaust passage is defined by the cylinder head of each bank and extends along the length of the engine within the valley between the banks.

An exhaust passage extends from each combustion chamber of each bank inwardly towards the valley to its respective main exhaust passage. The main exhaust passages merge into a single passage for routing exhaust from the motor.

In one arrangement, the main exhaust passages merge at an end of the engine. In another arrangement, the main exhaust passages merge generally centrally along the length of the engine. In yet another arrangement, the engine is connected at one end to an exhaust guide having a pair of exhaust passages corresponding to the main exhaust passages. The exhaust passages in the exhaust guide merge into a single exhaust passage. The main exhaust passages and the exhaust passages in the exhaust guide are connected with a flexible hose.

In another embodiment, an exhaust passage extends from each combustion chamber of each bank inwardly towards the valley between the banks. A single main exhaust passage is preferably positioned within an exhaust manifold which extends along the length of the engine within the valley between the banks. The exhaust passage from each combustion chamber preferably extends to a branch passage in the manifold leading to the main passage.

In one arrangement of this embodiment, a starter motor for the engine is positioned in an otherwise empty space in the valley between the manifold, cylinder block and cylinder heads. In another arrangement, the exhaust manifold has slanted mounting surfaces which engage slanted surfaces of the cylinder heads, whereby the manifold sits deep within the valley between the banks.

In another embodiment, a main exhaust passage extends through the valley between the banks. The exhaust passage from each combustion chamber curves inwardly to the main exhaust passage. A main oil gallery is also positioned in the valley, but is separated from the main exhaust passage by a coolant passage.

In one arrangement of this embodiment, a coolant jacket surrounding the main exhaust passage is formed with a coolant jacket surrounding each combustion chamber. In another arrangement, the wall of the cylinder block are made thin by removing cylinder liners, allowing for an enlarged exhaust passage in the valley.

Further objects, features, and advantages of the present invention over the prior art will become apparent from the detailed description of the drawings which follows, when considered with the attached figures.

3

Figure 1:
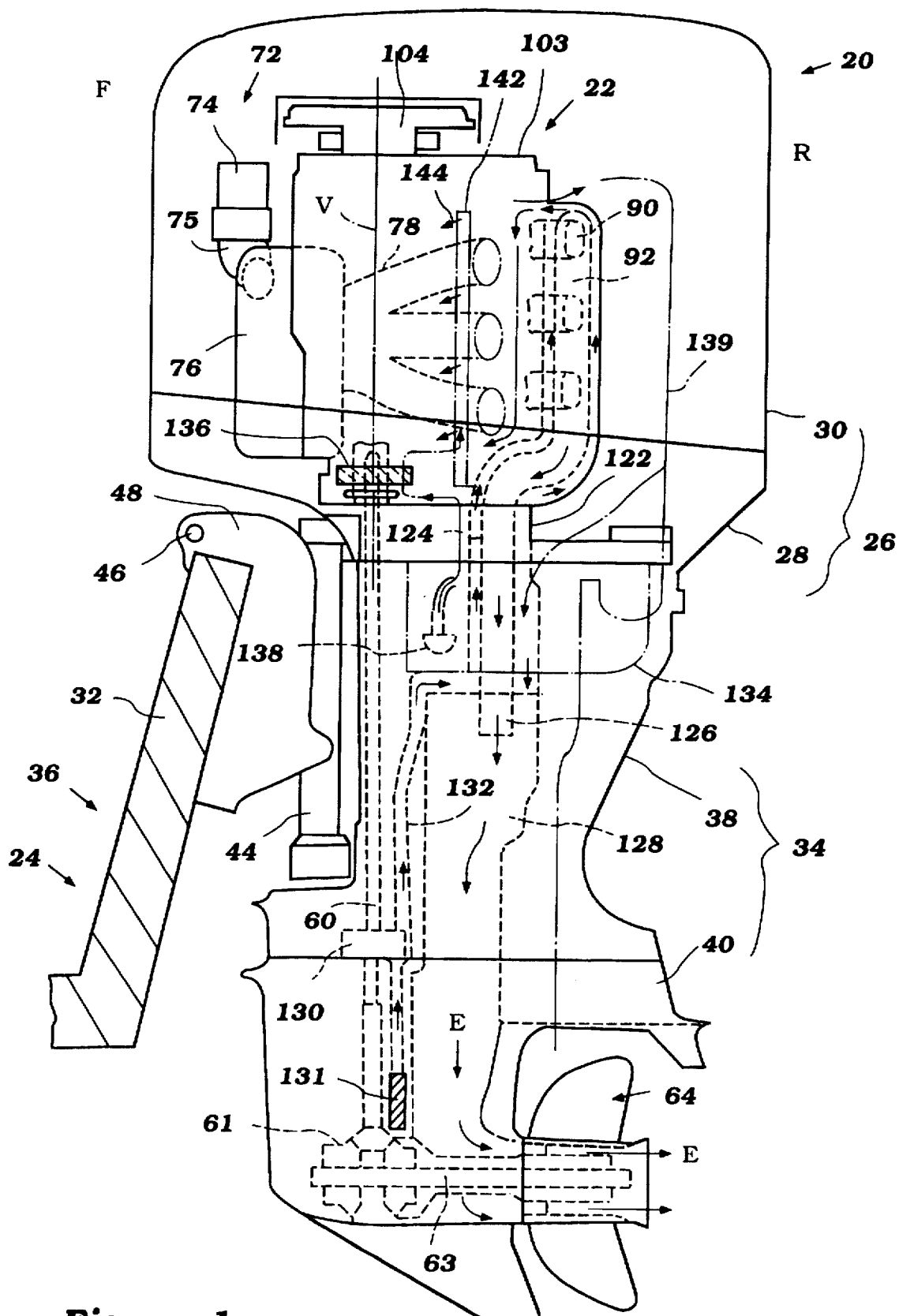
FIG. 1 is a side view of an outboard motor powered by an engine, illustrated in phantom, the motor having an exhaust system in accordance with a first embodiment of the present invention.
Figure 7:
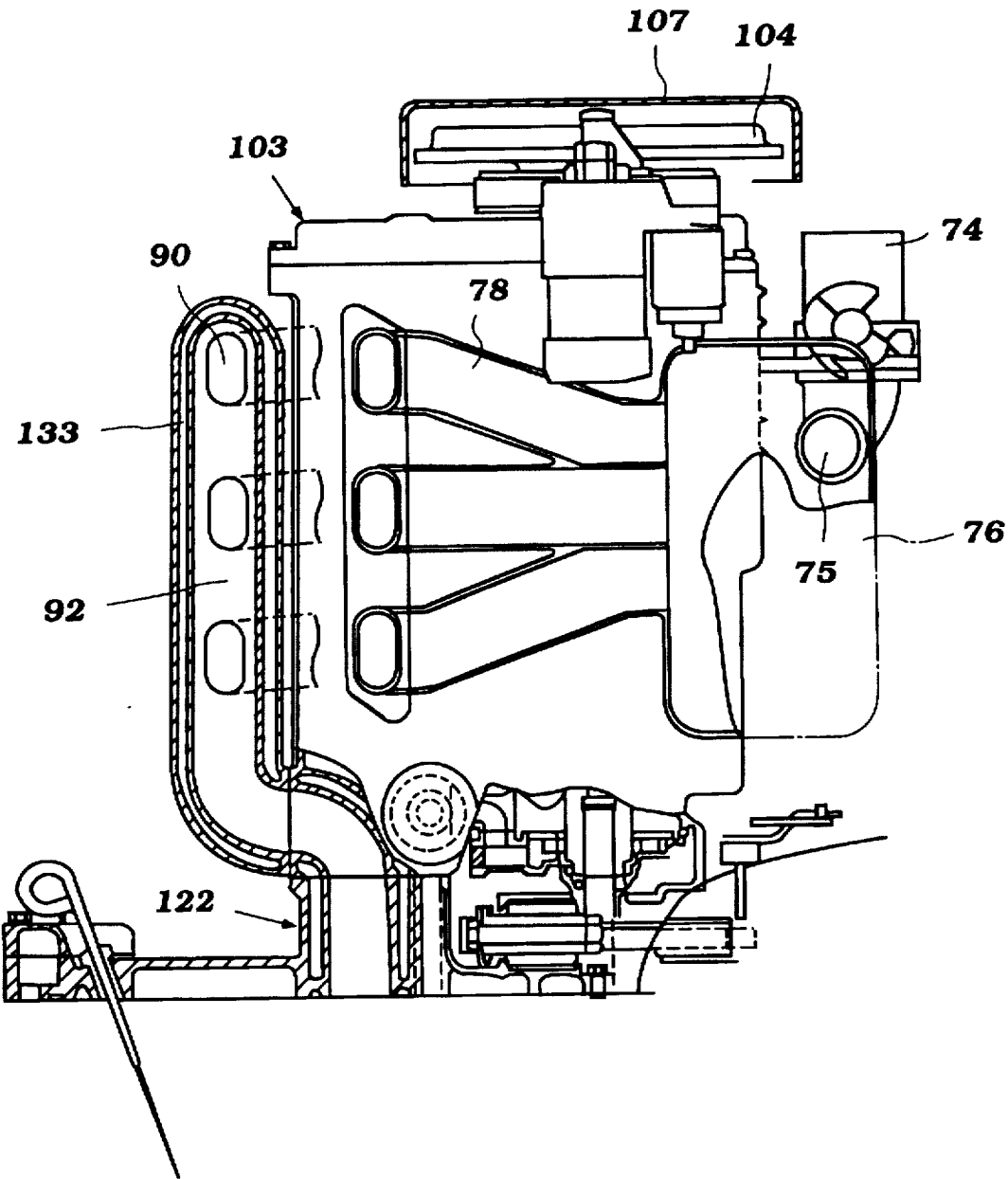
Figure 8:
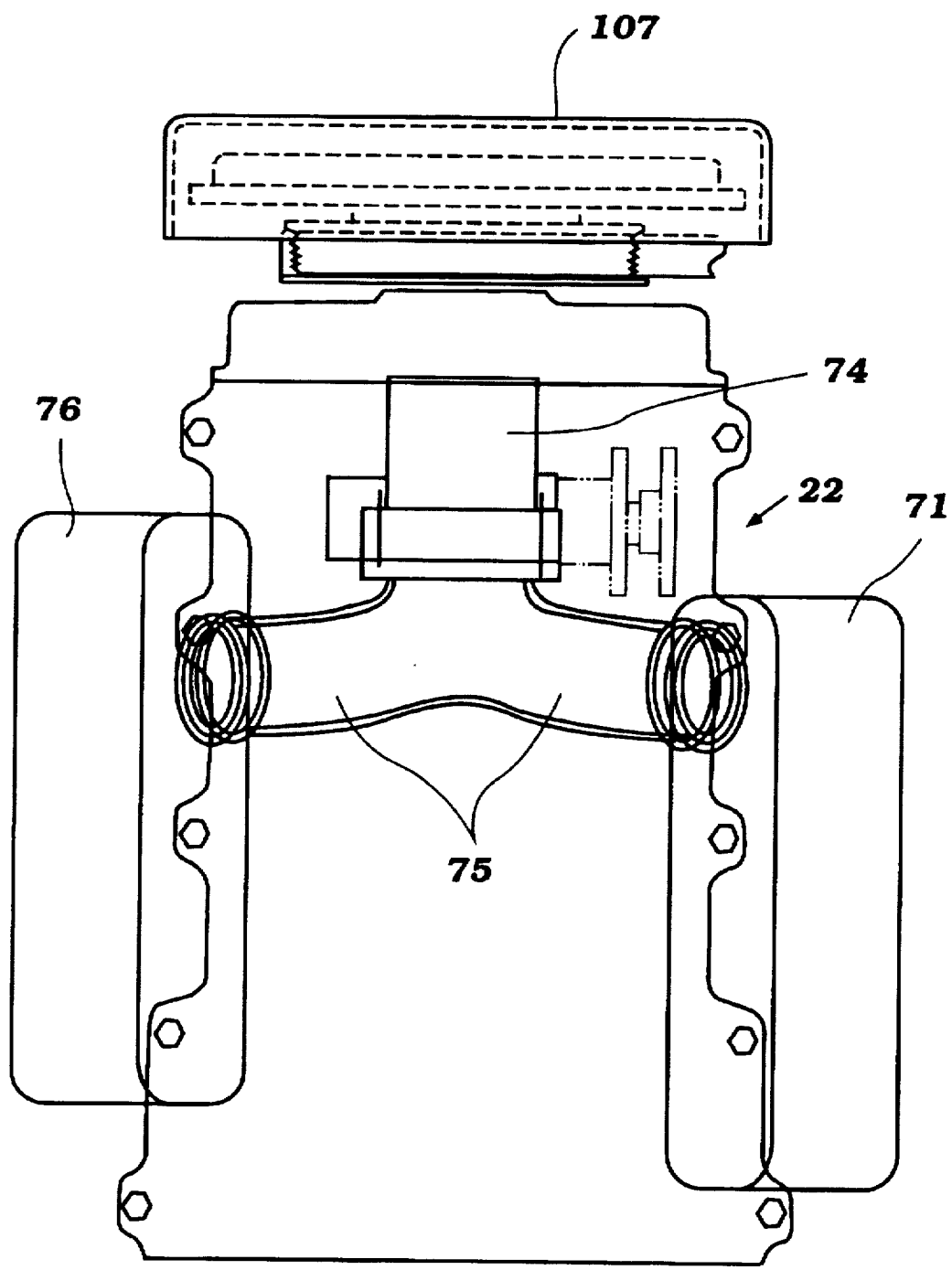
Figure 9:
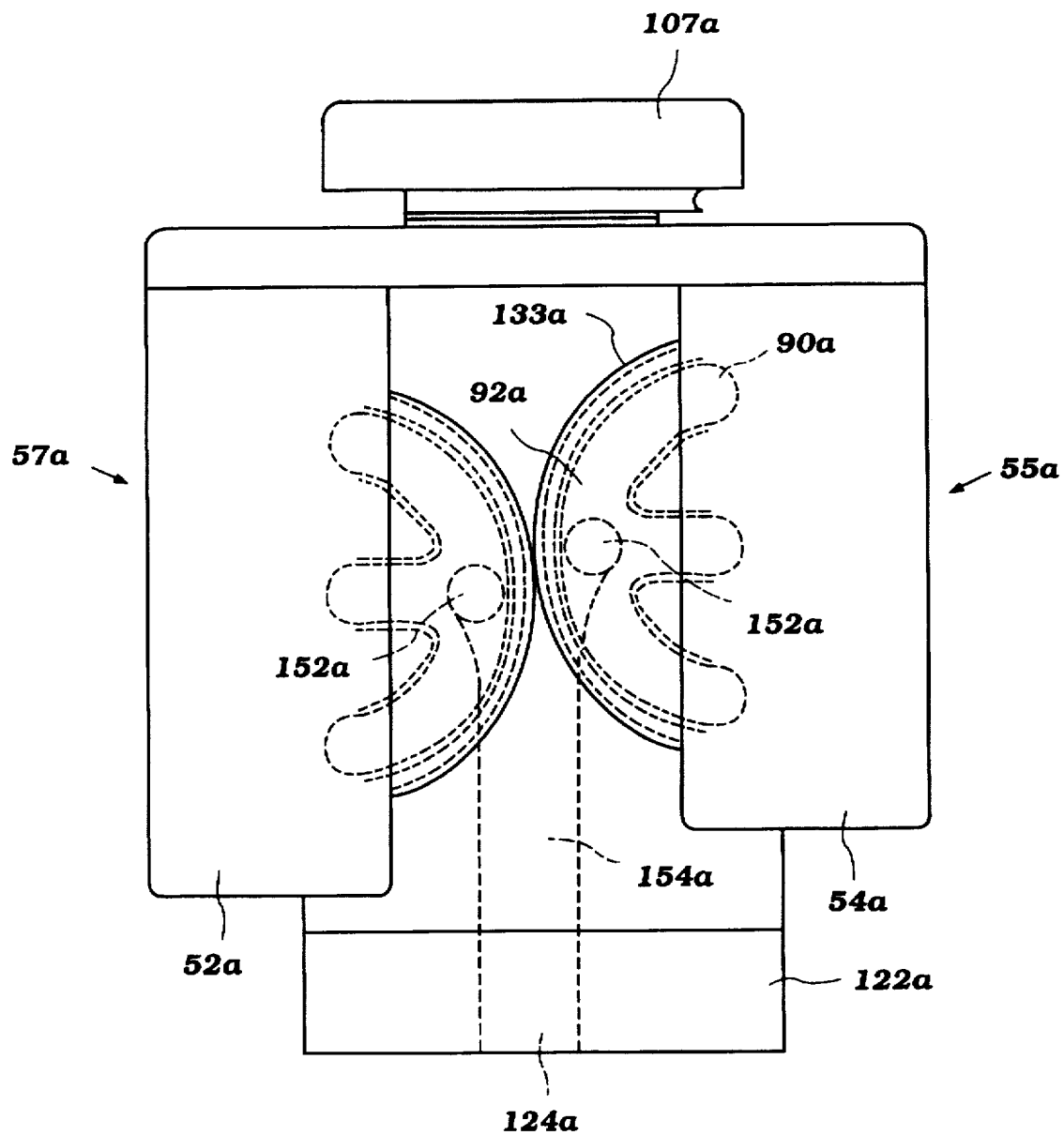
Figure 10:
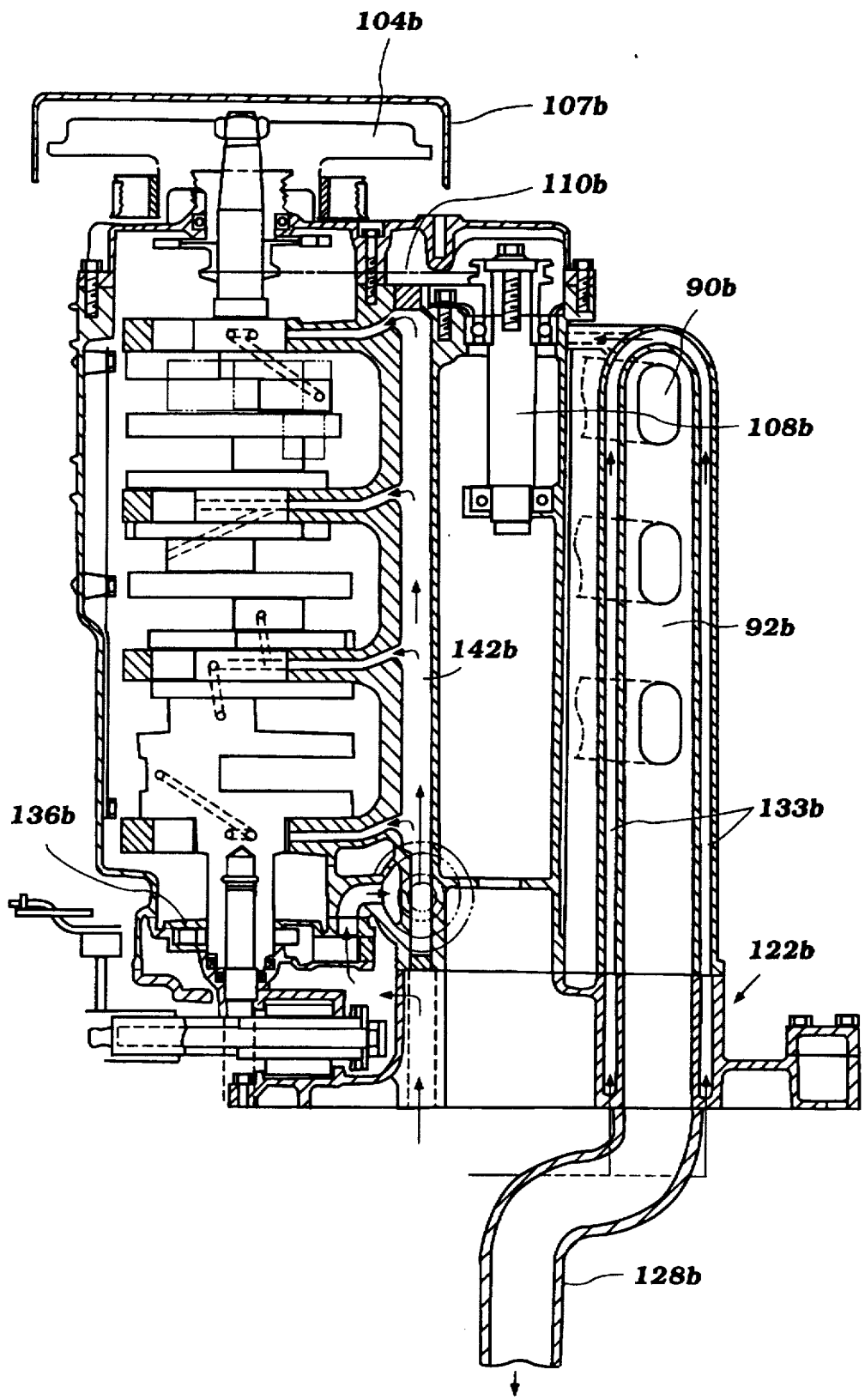
Figure 11:
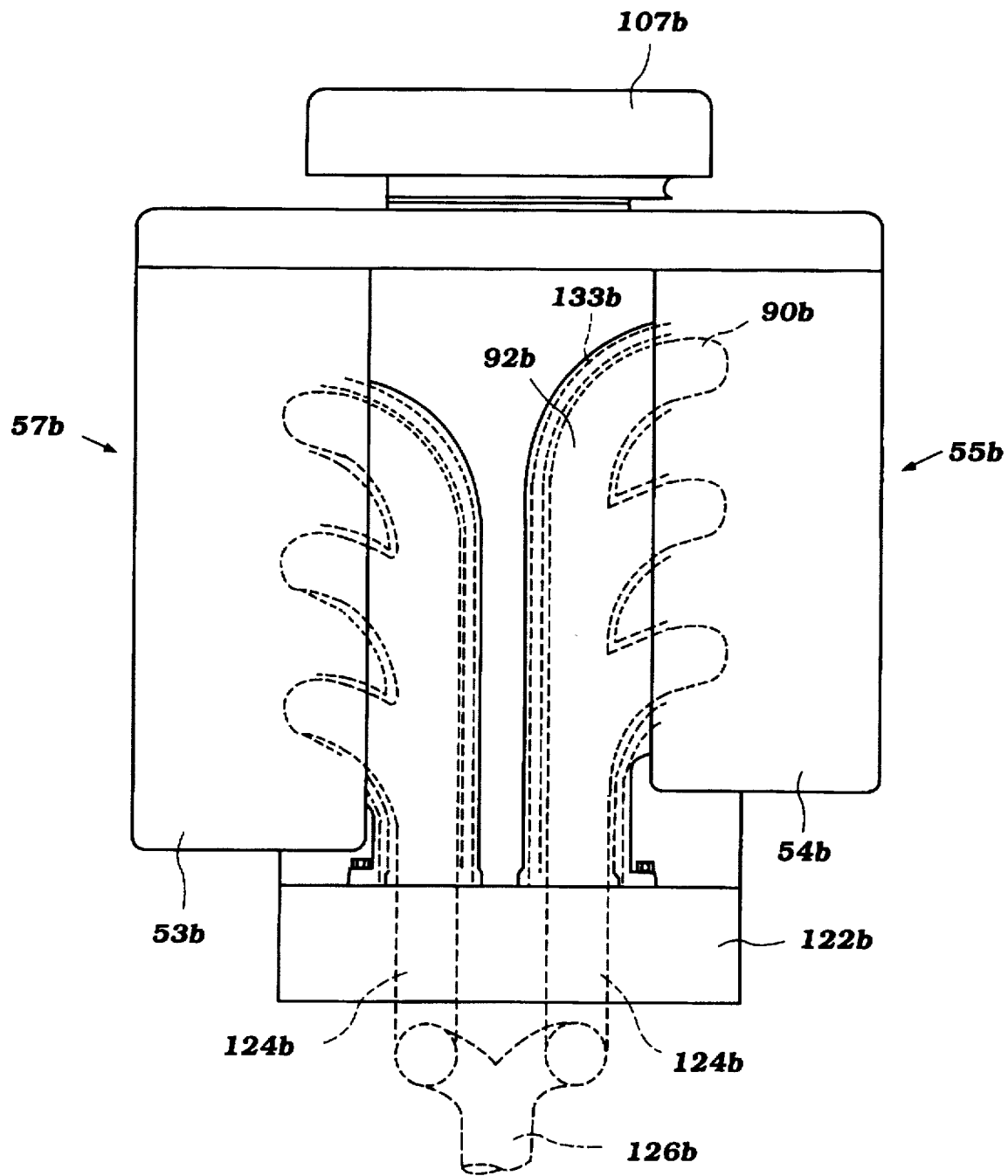
Figure 12A:
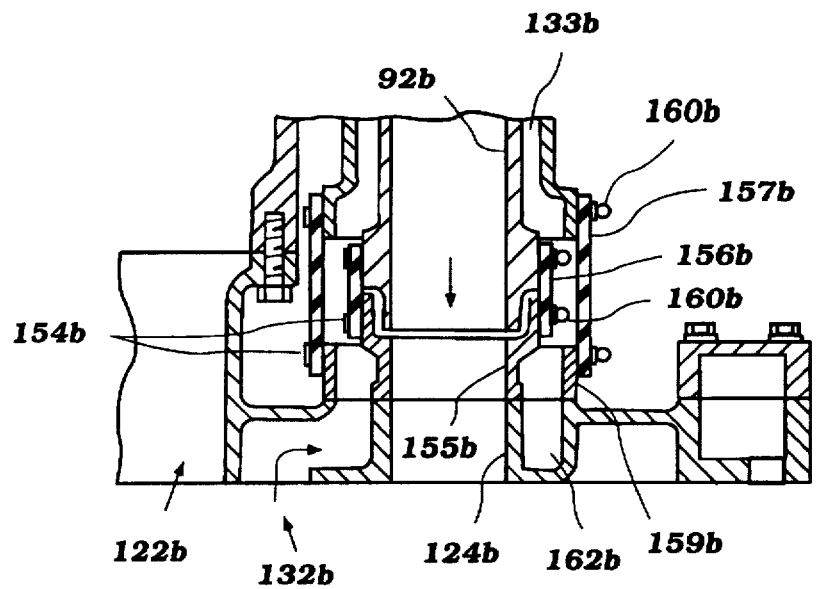
Figure 12B:
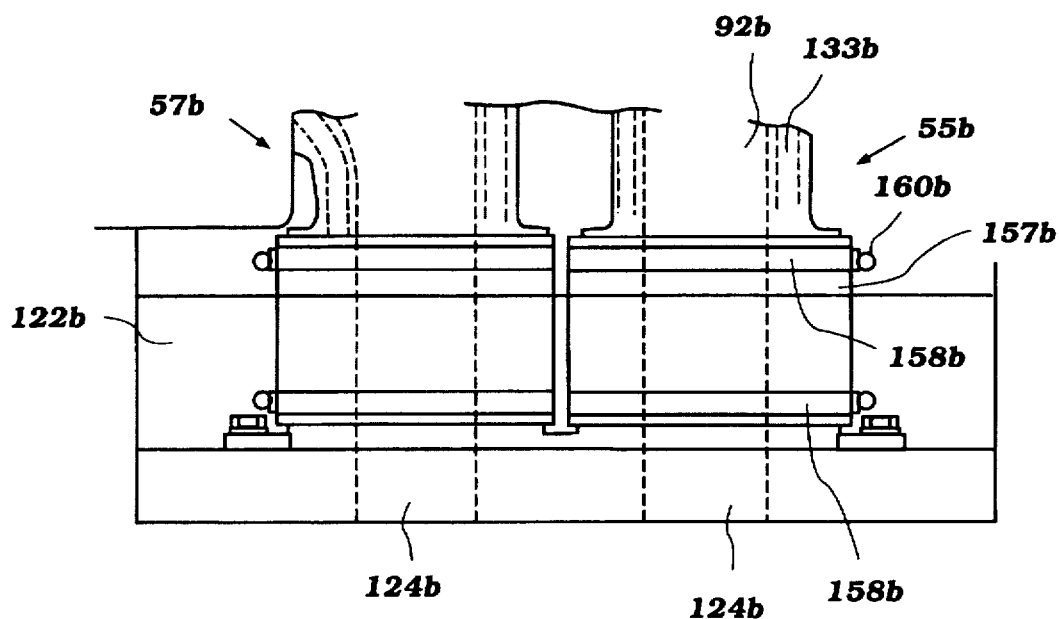
Figure 13:
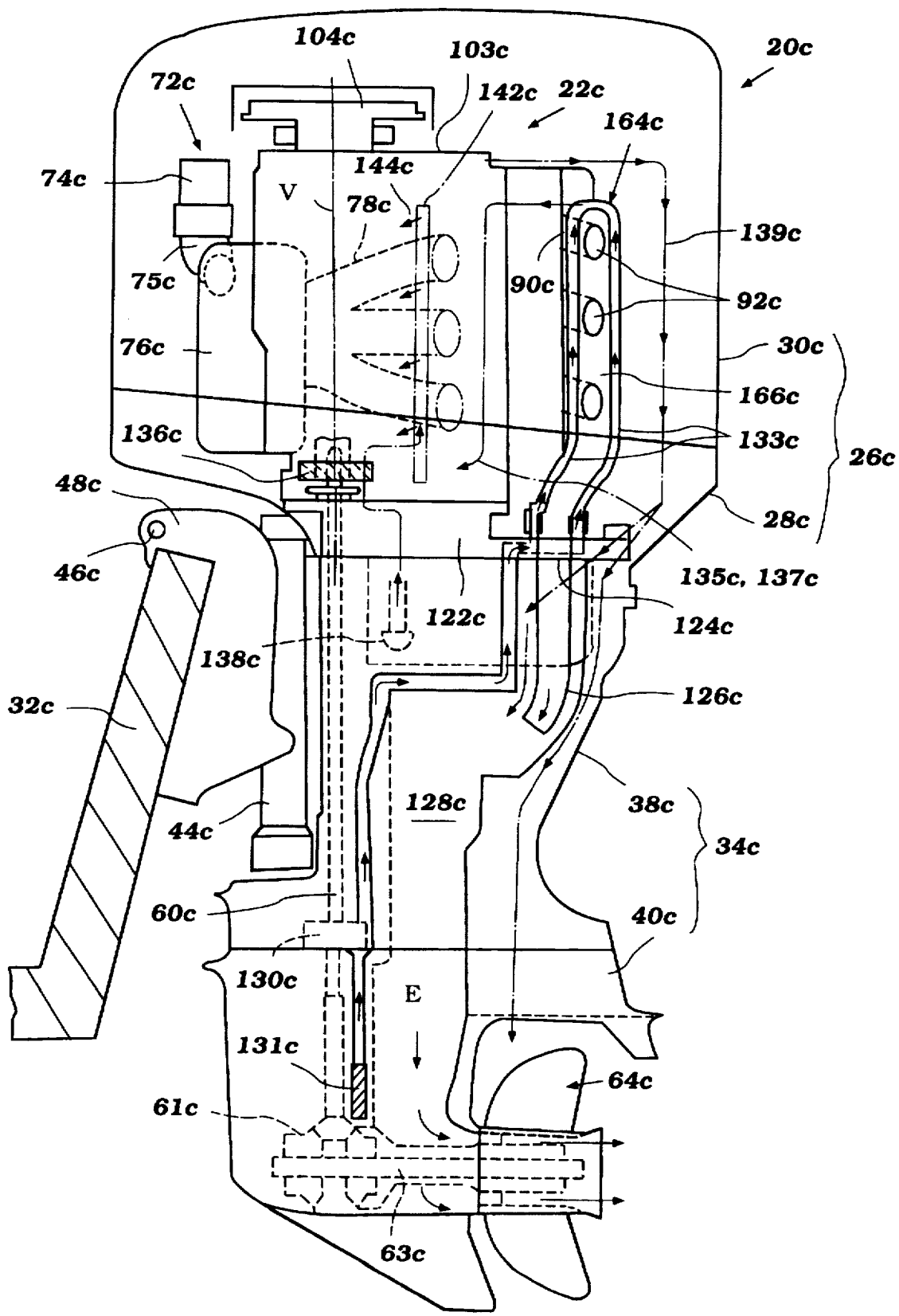
Figure 14:
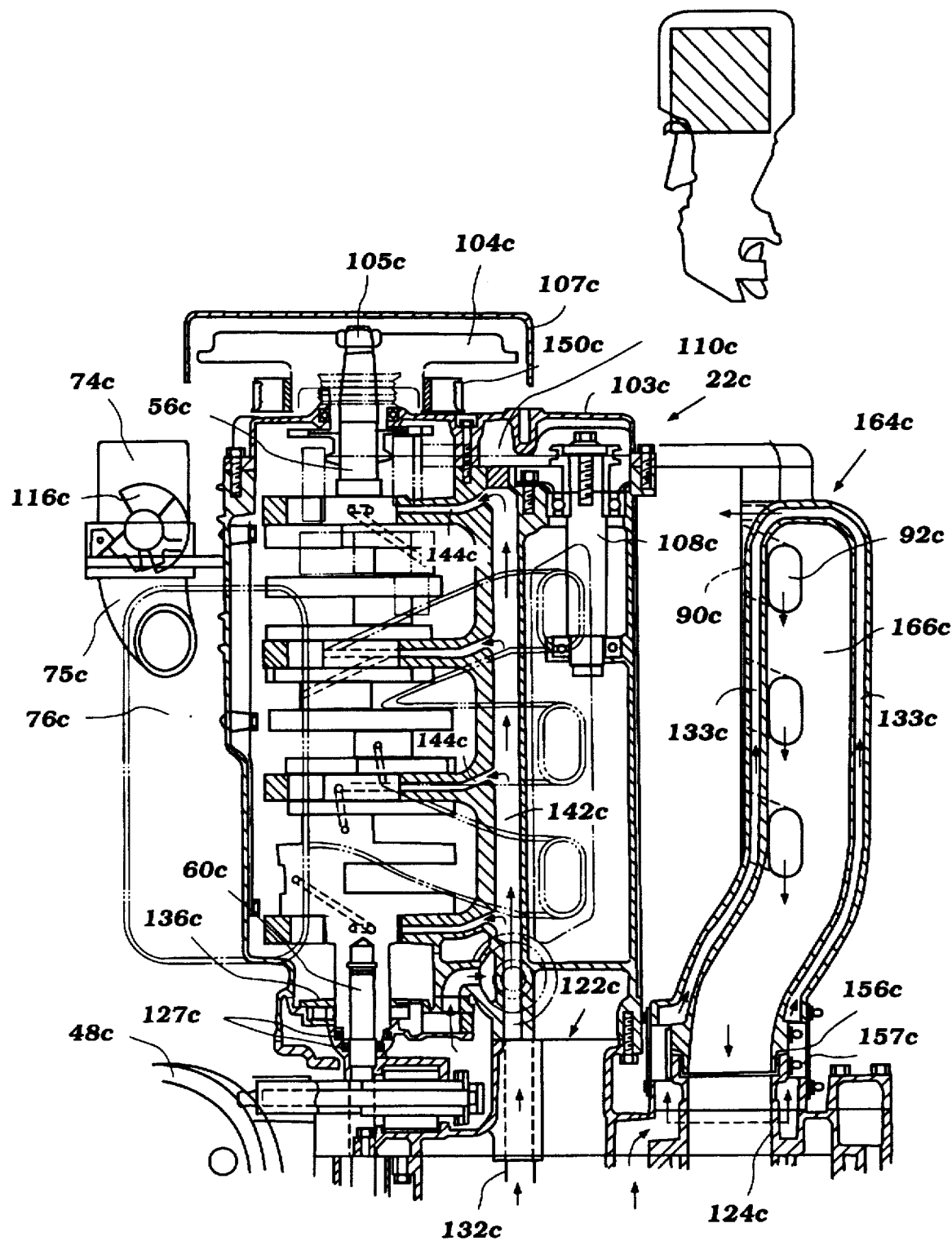
Figure 15:
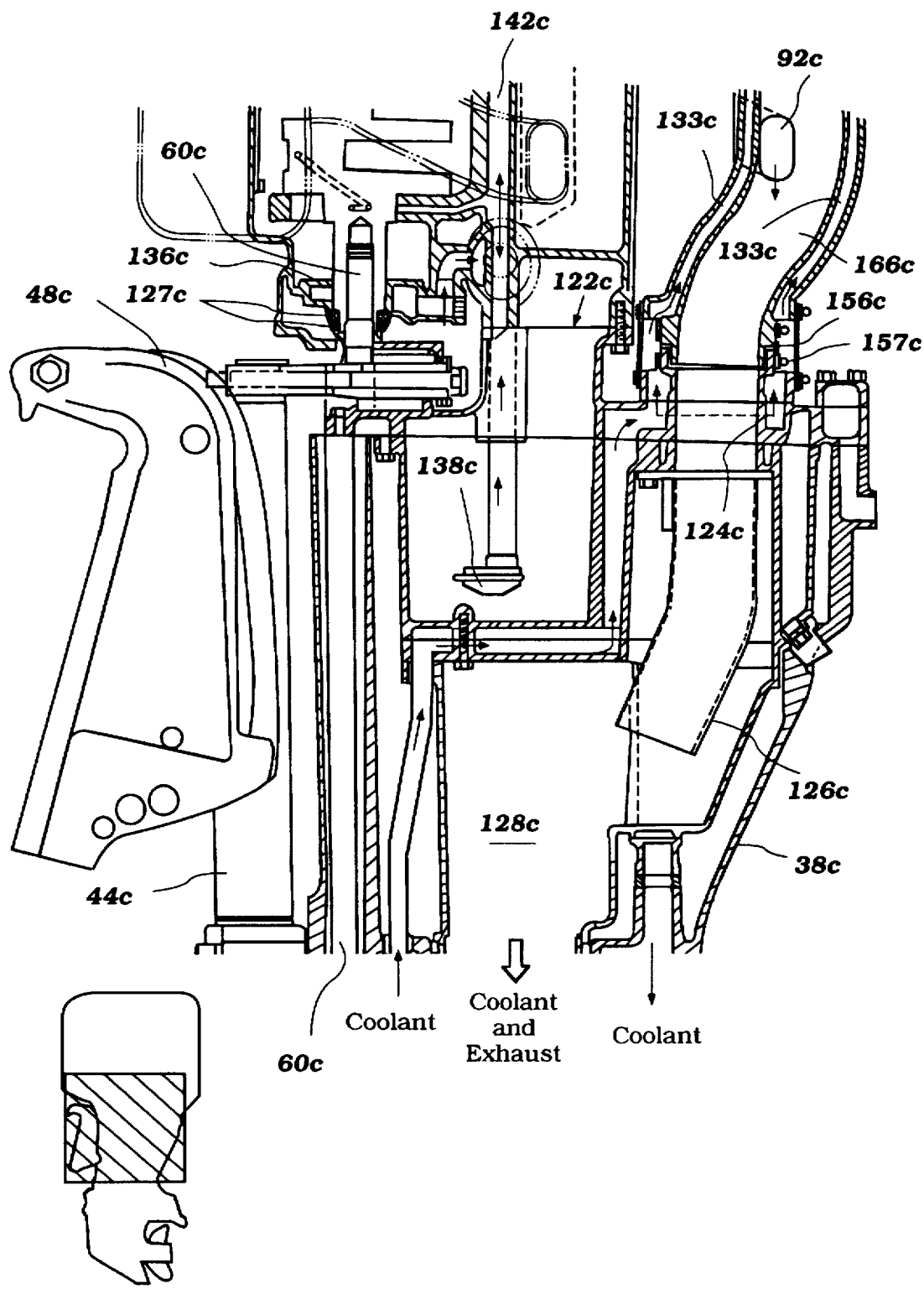
Figure 16:
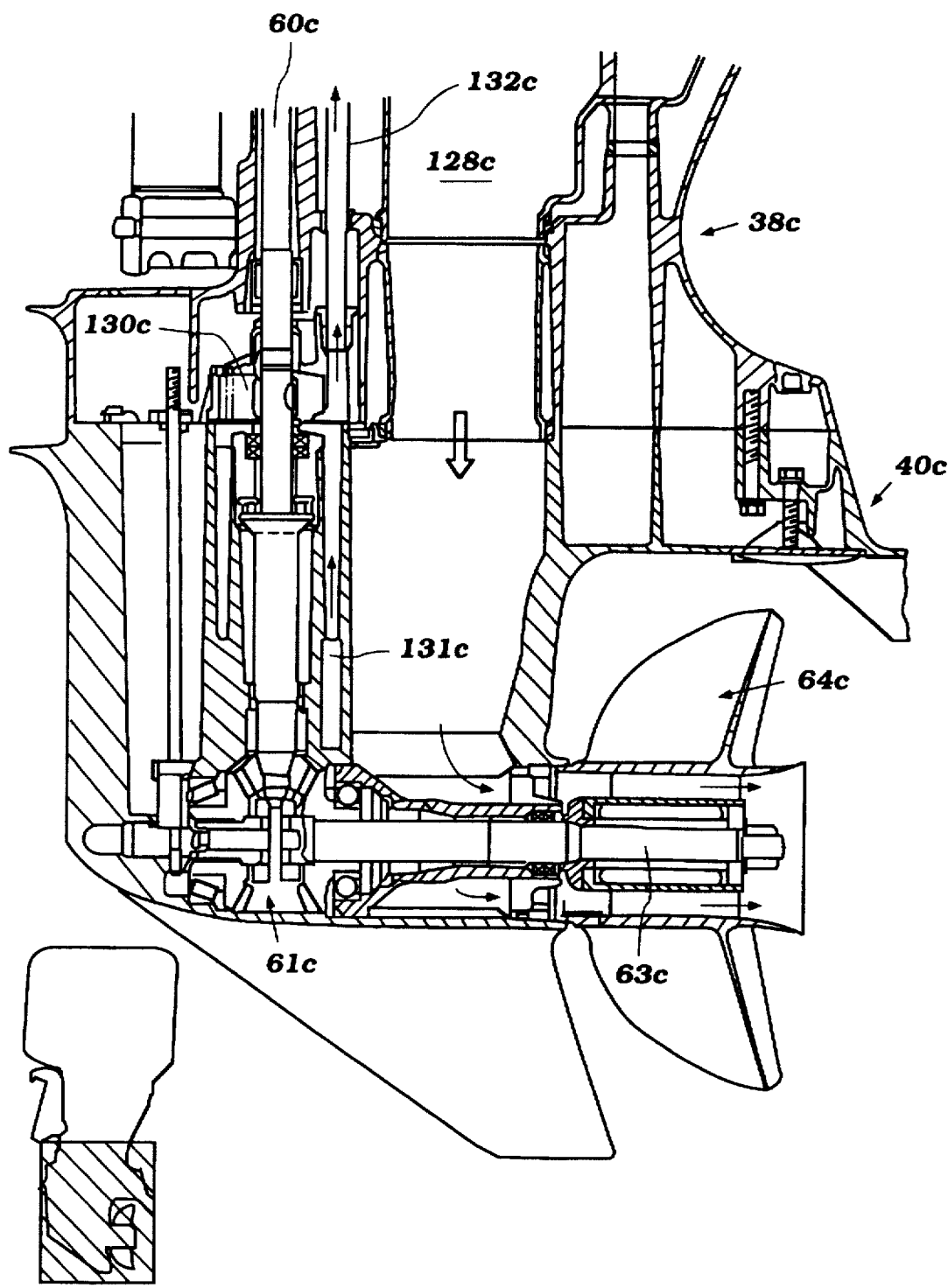
Figure 17:
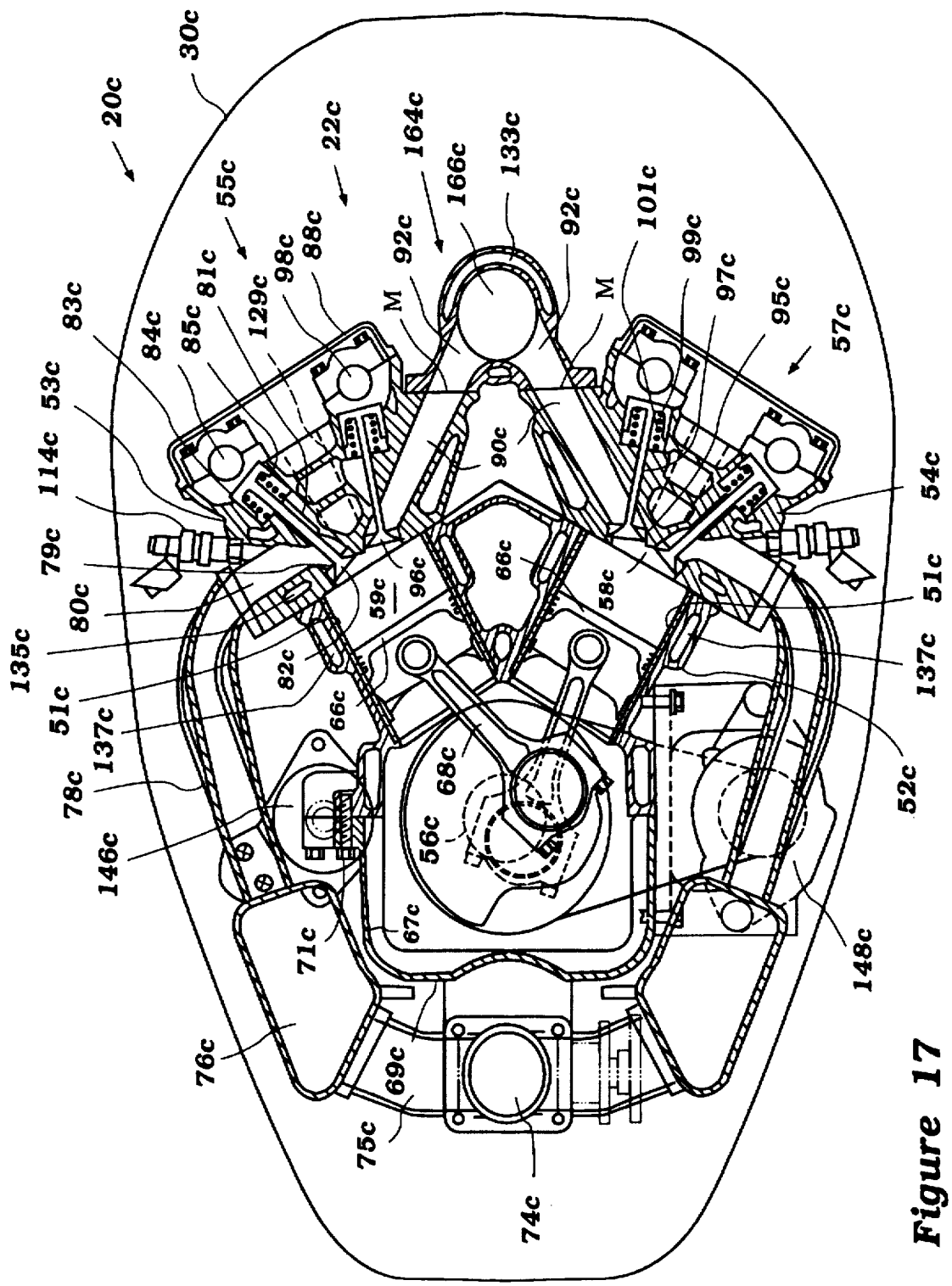
Figure 18:
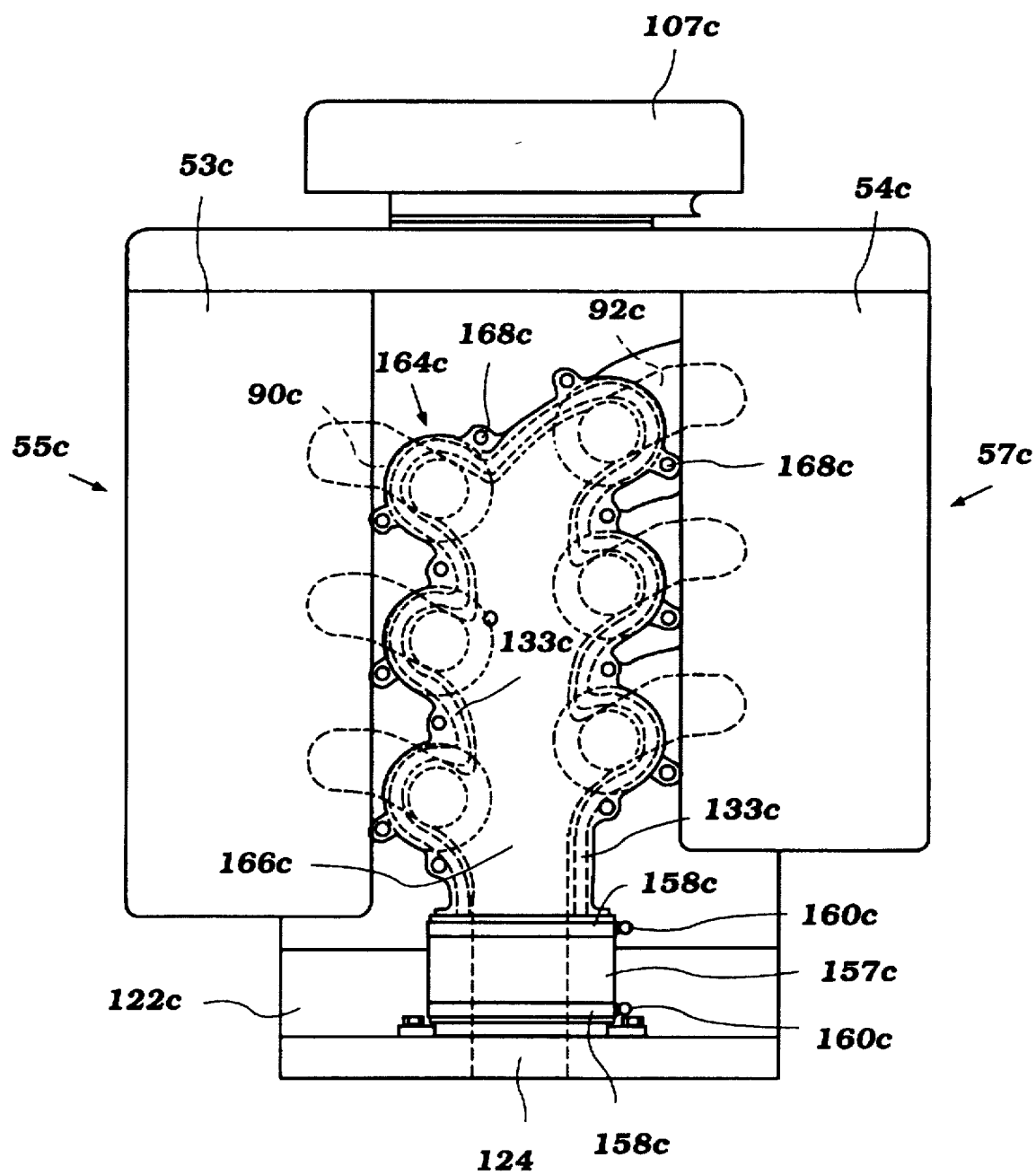
Figure 19:
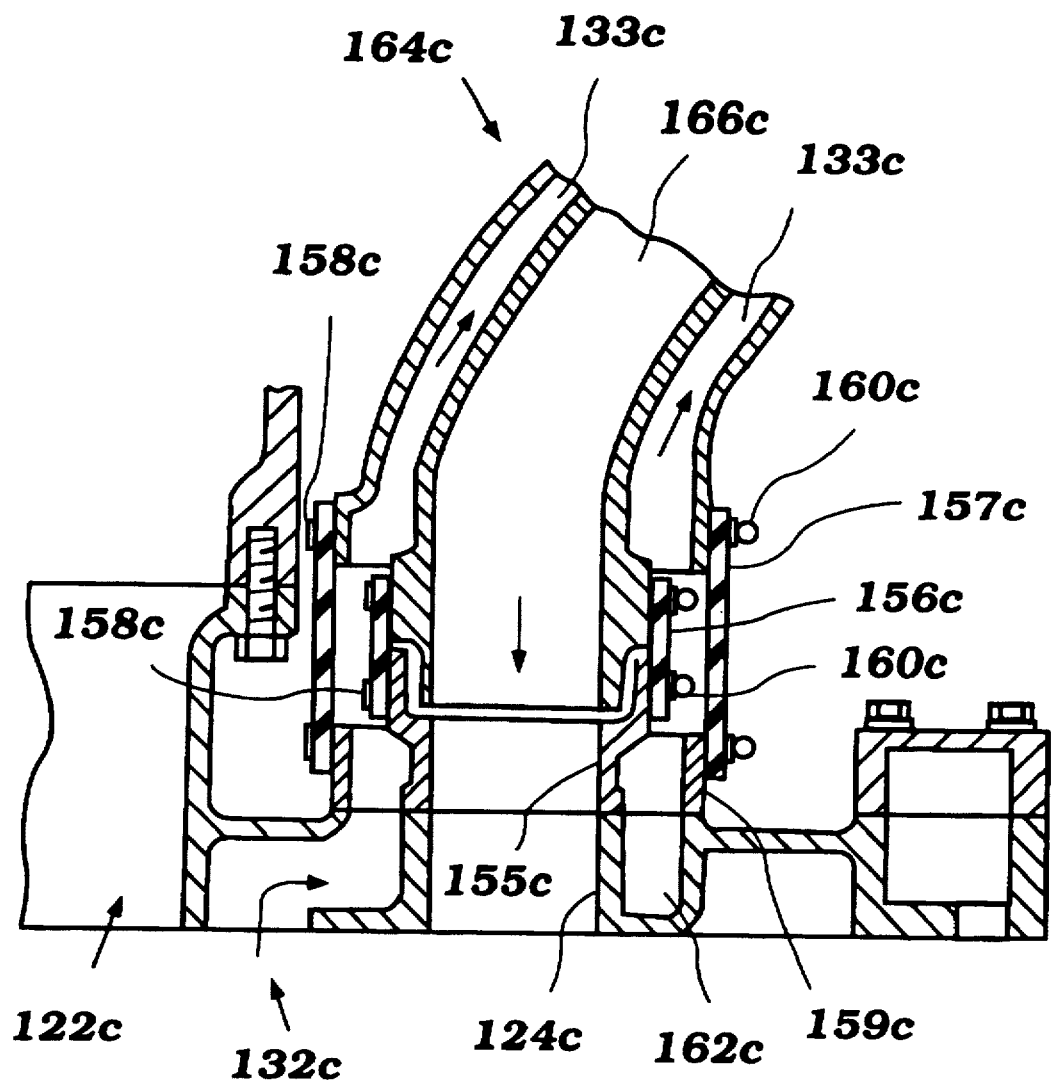
Figure 20:
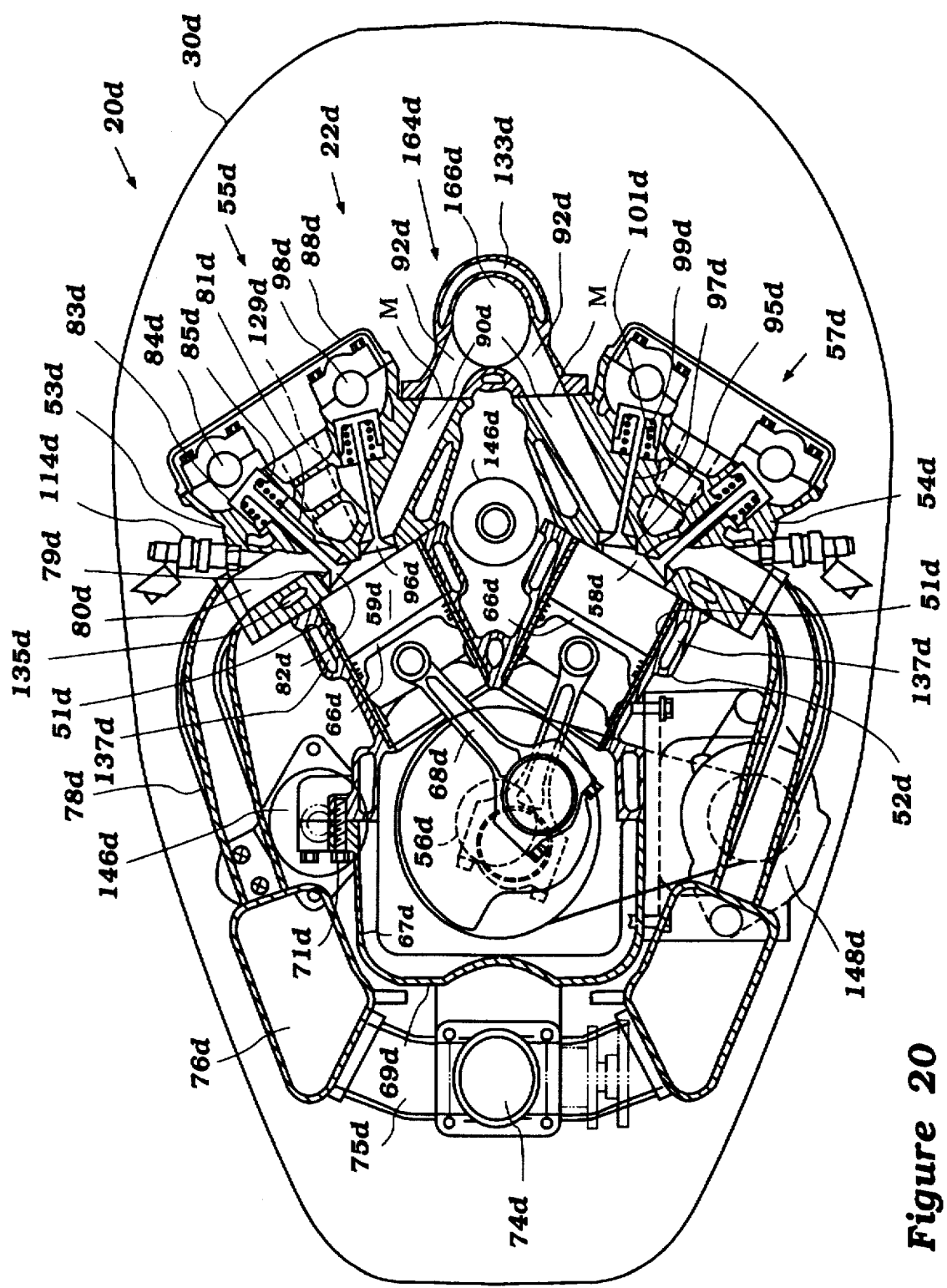
Figure 21:
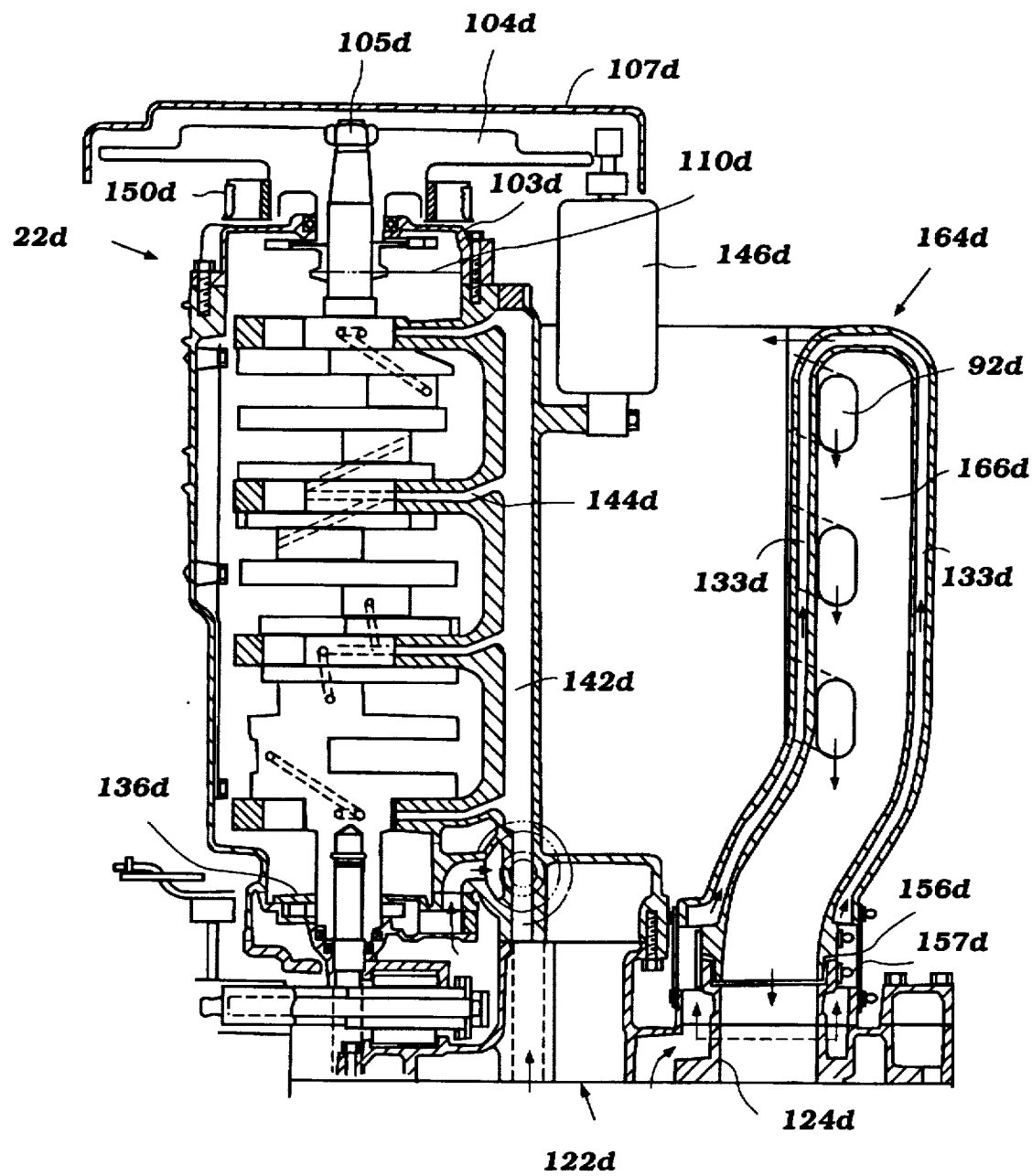
Figure 22:
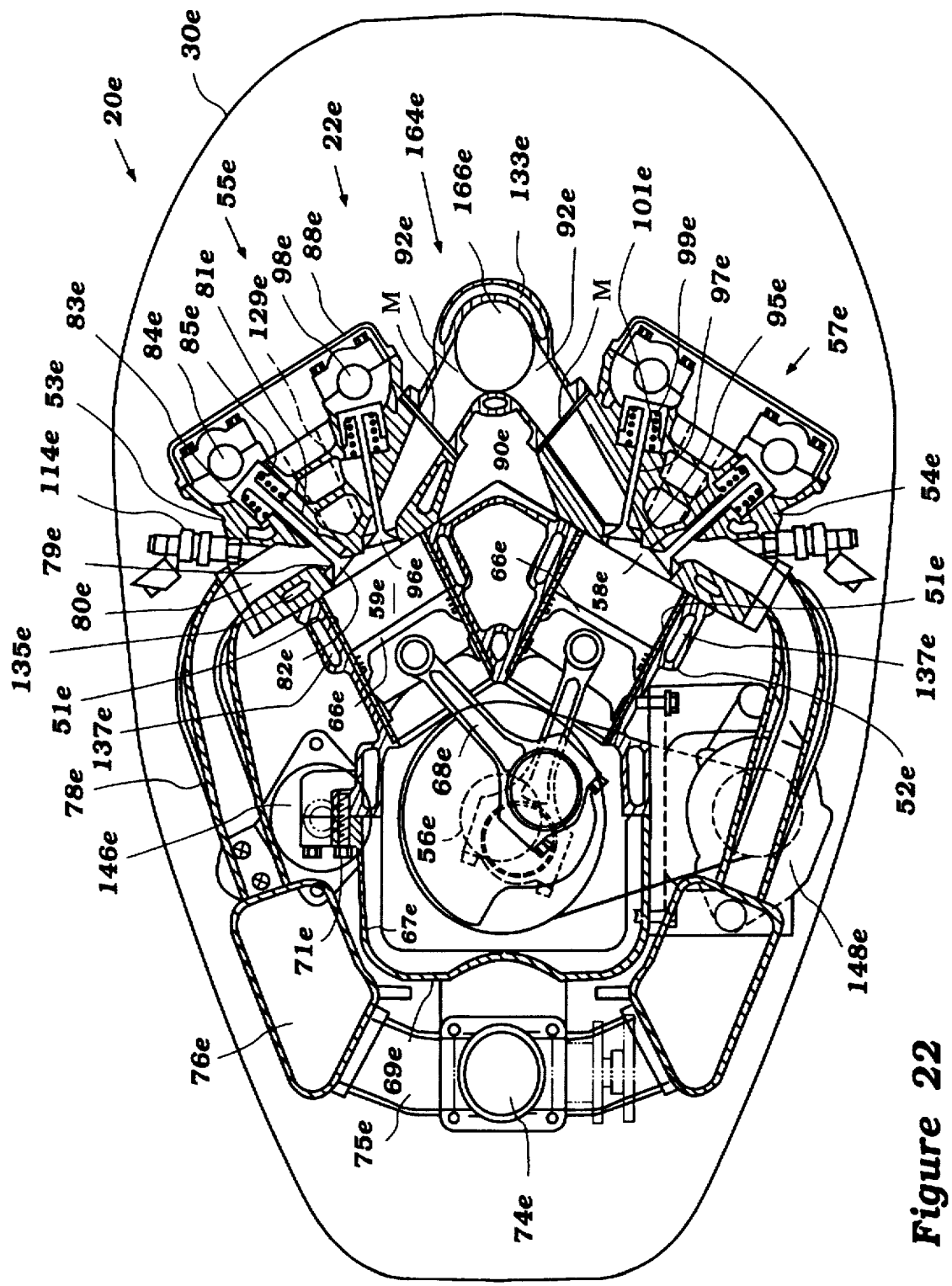
Figure 23:
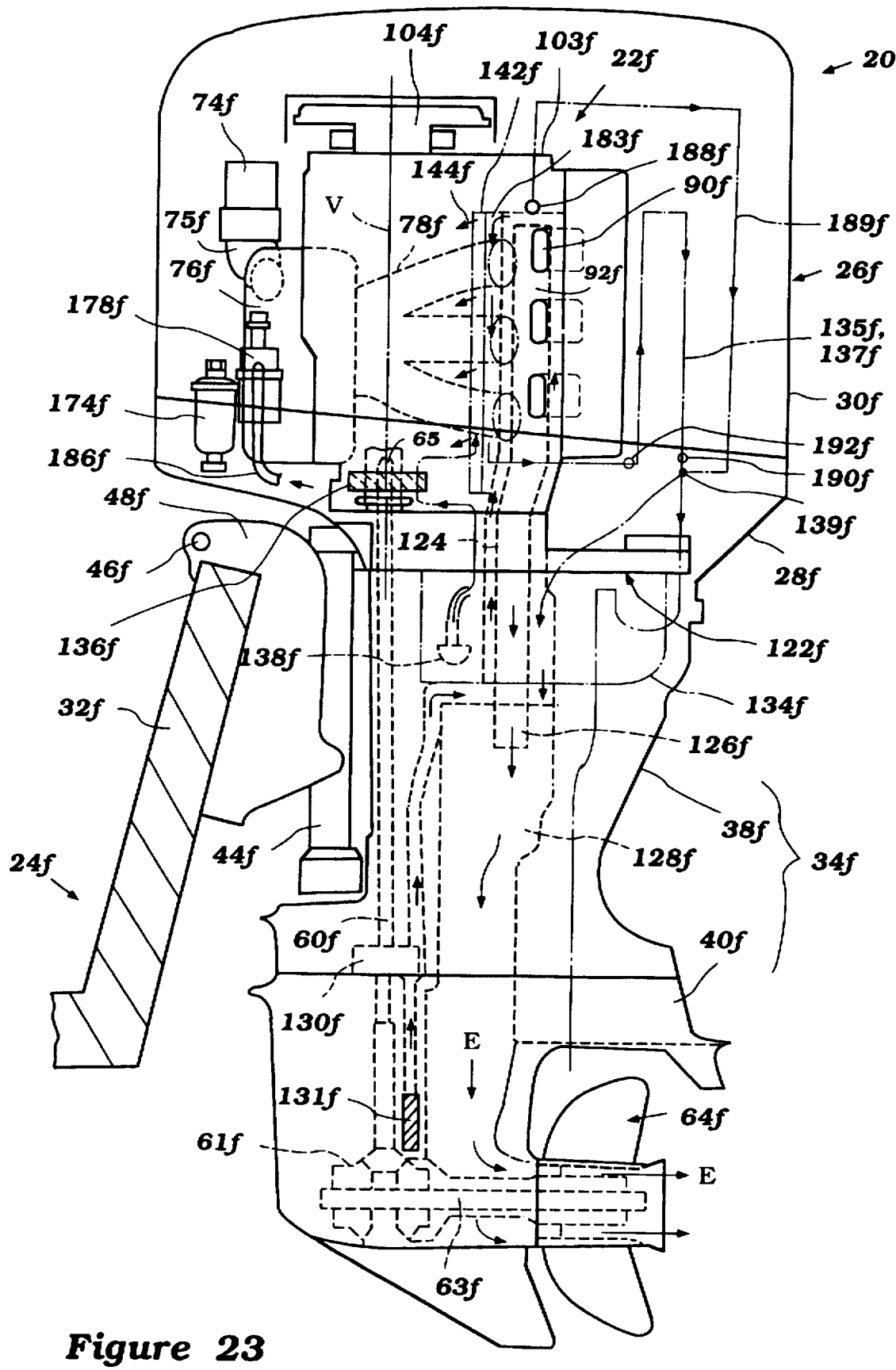
Figure 24:
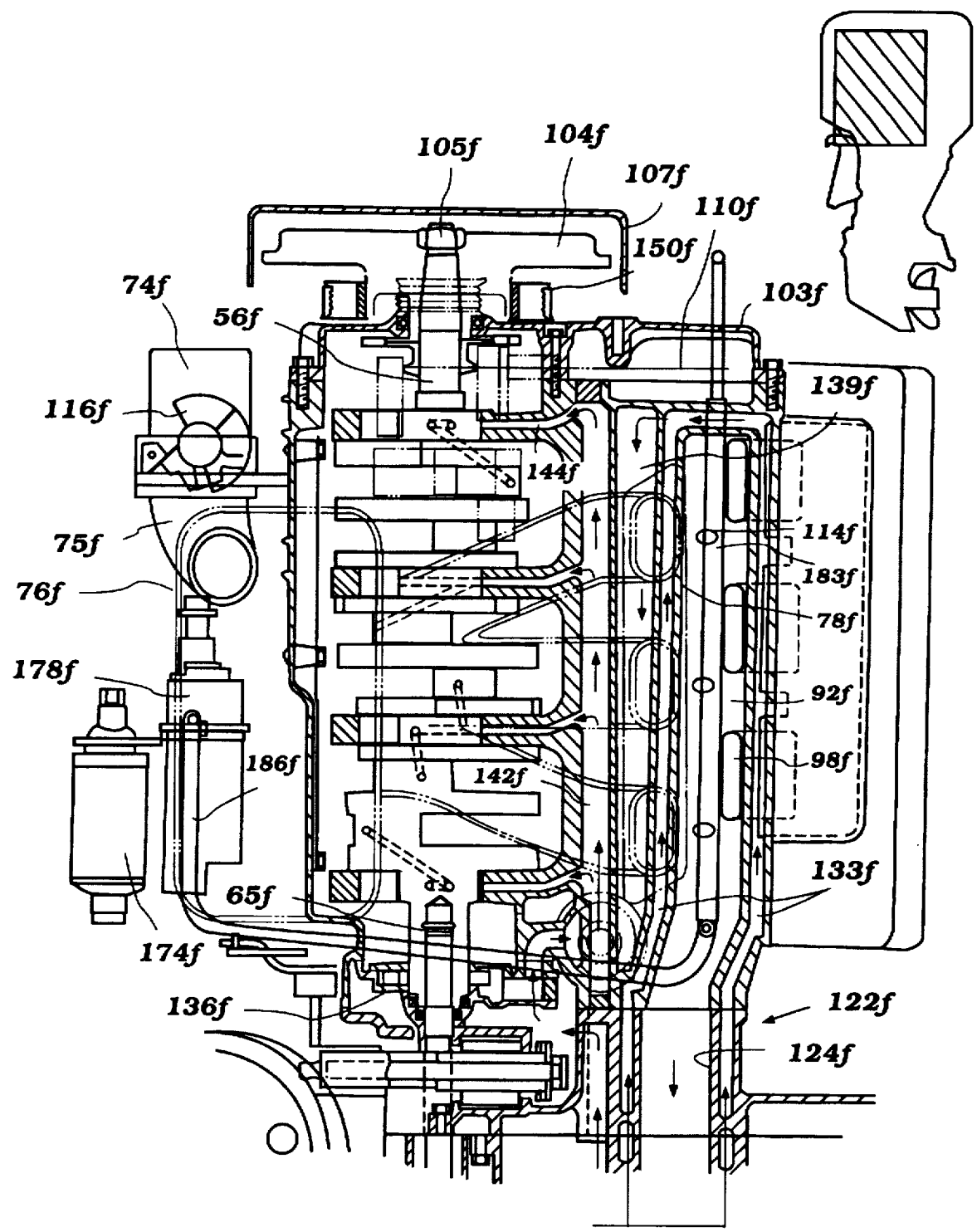
Figure 25:
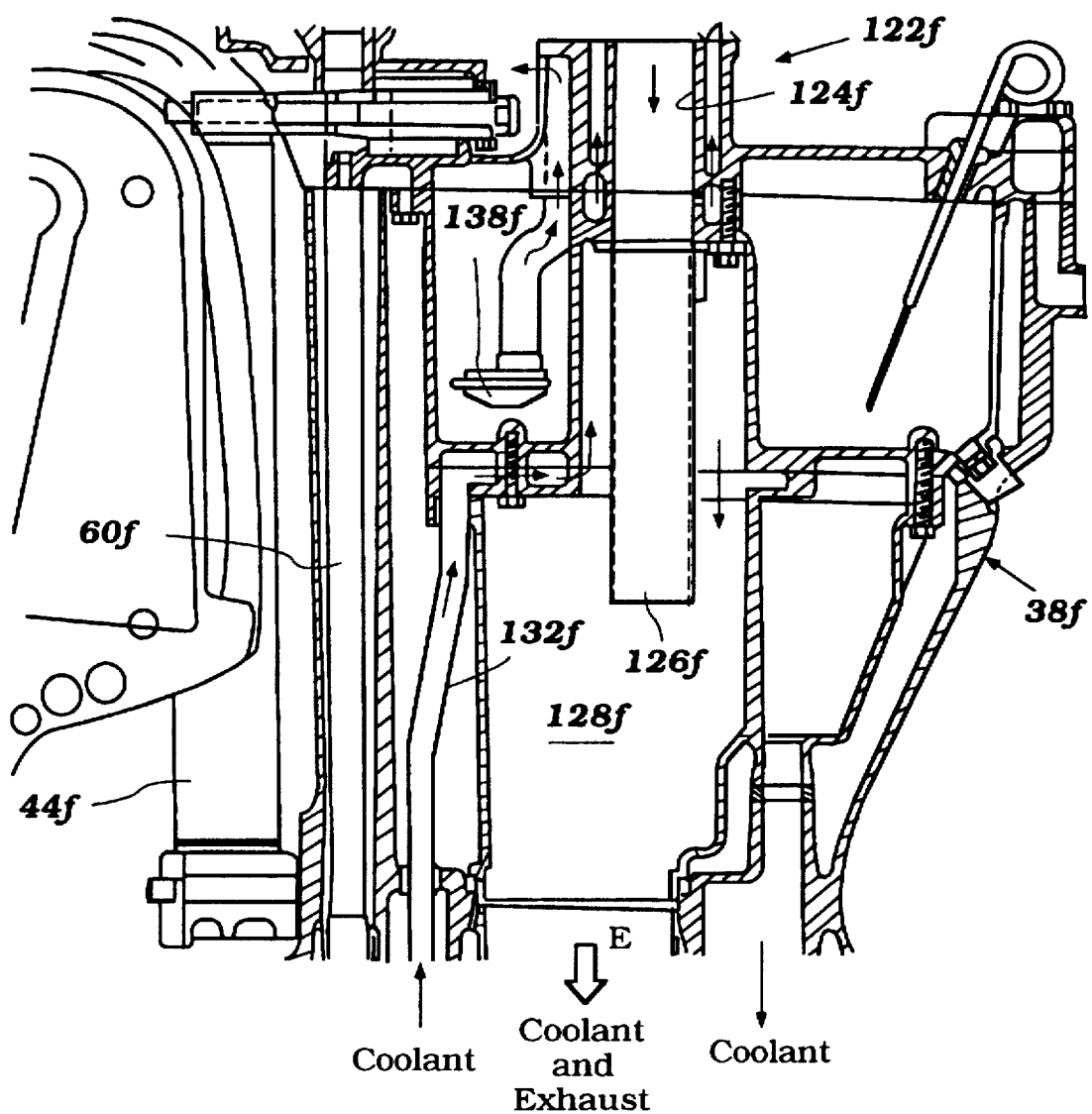
Figure 25:
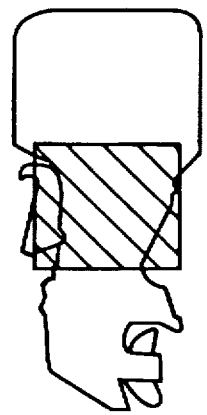
Figure 26:
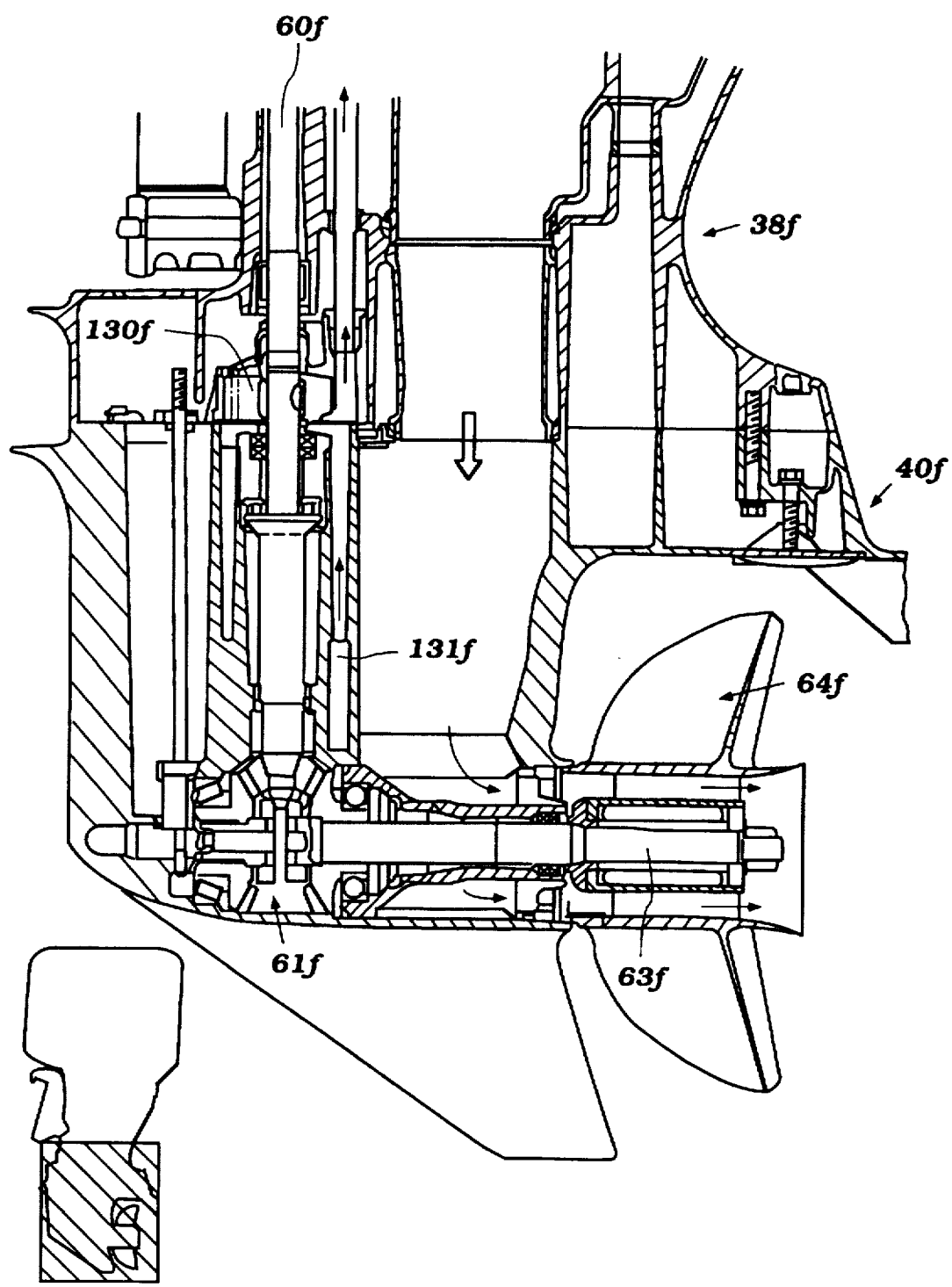
Figure 27:
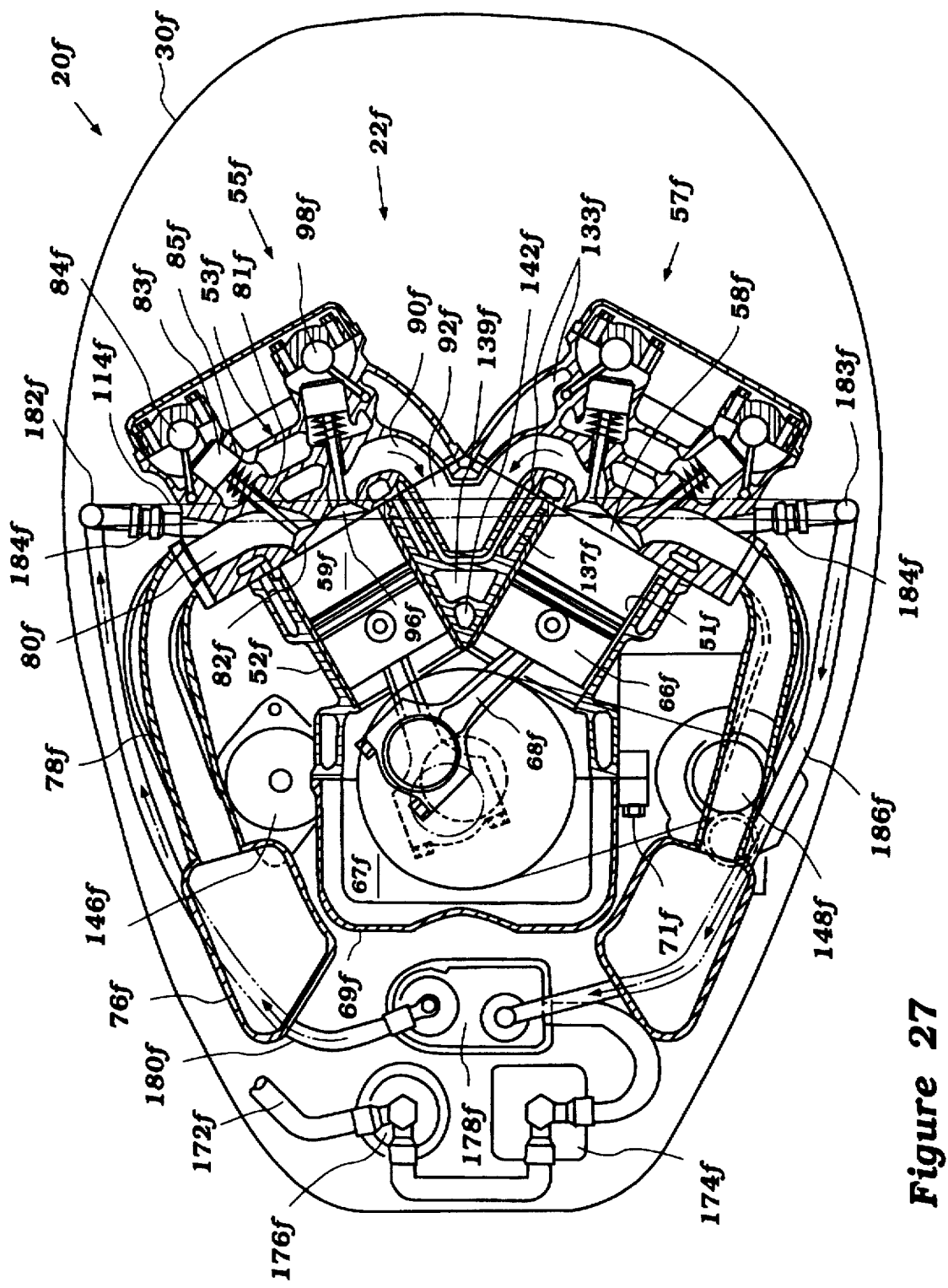
Figure 28:
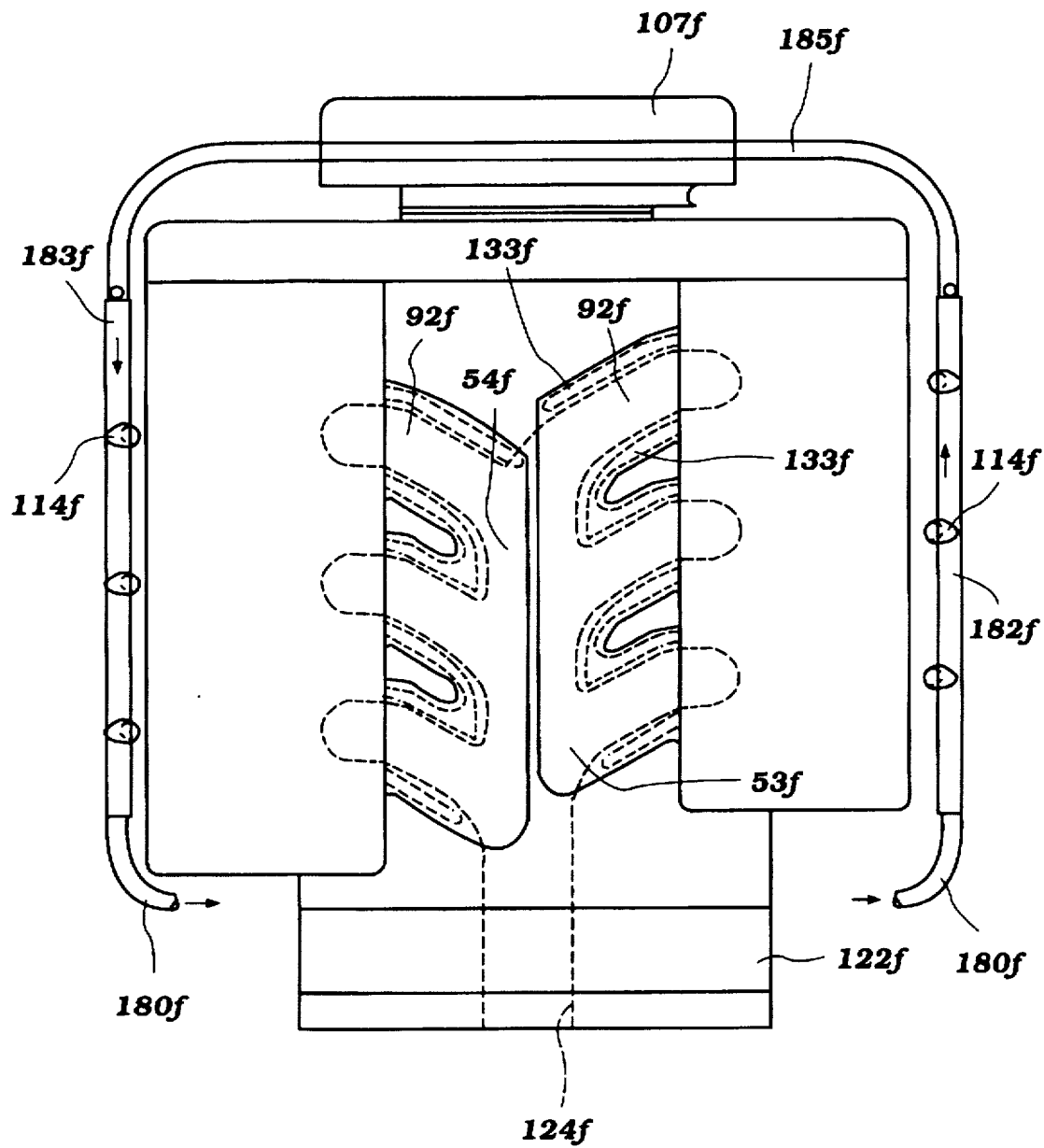
Figure 29:
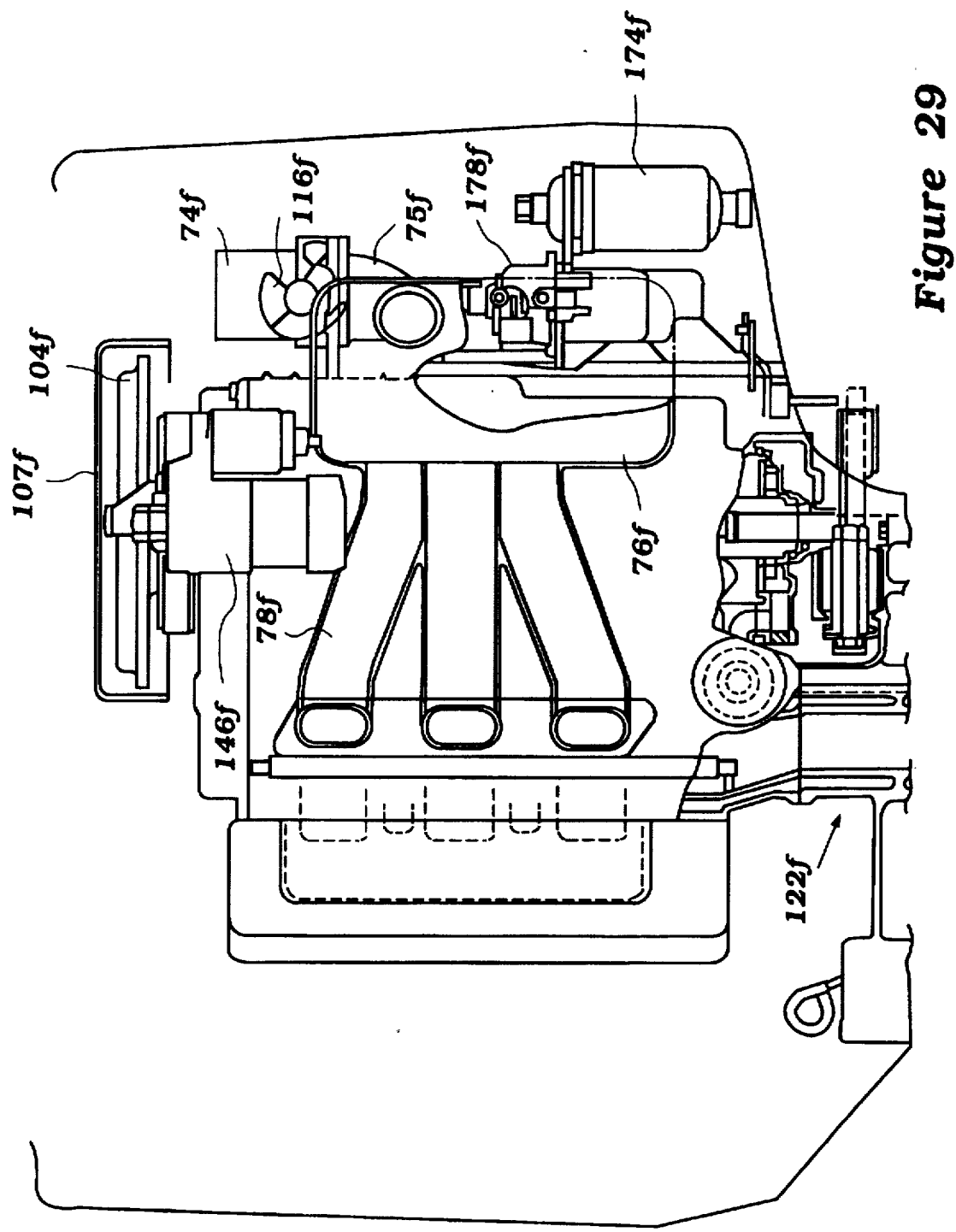
Figure 30:
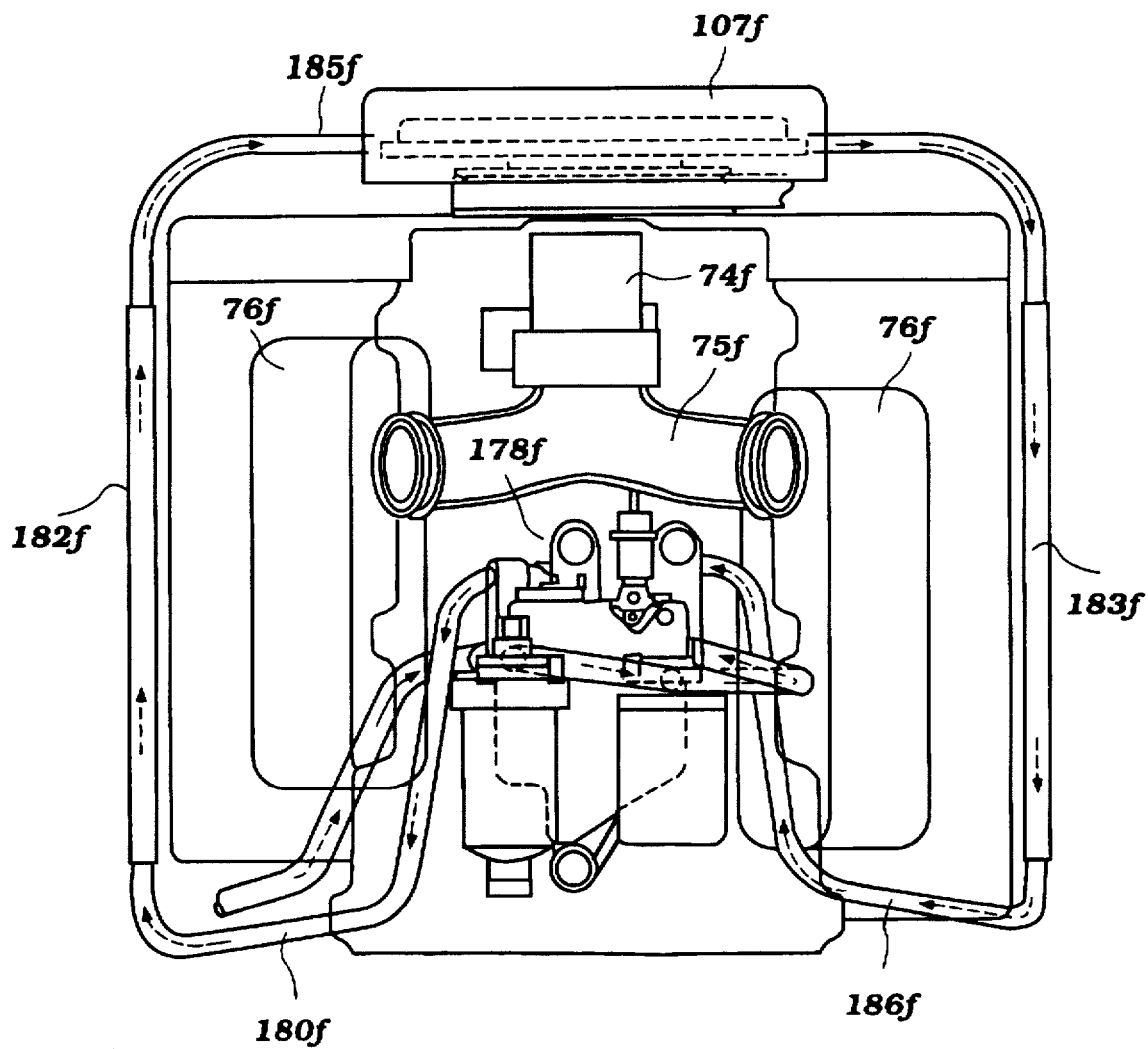
Figure 31:
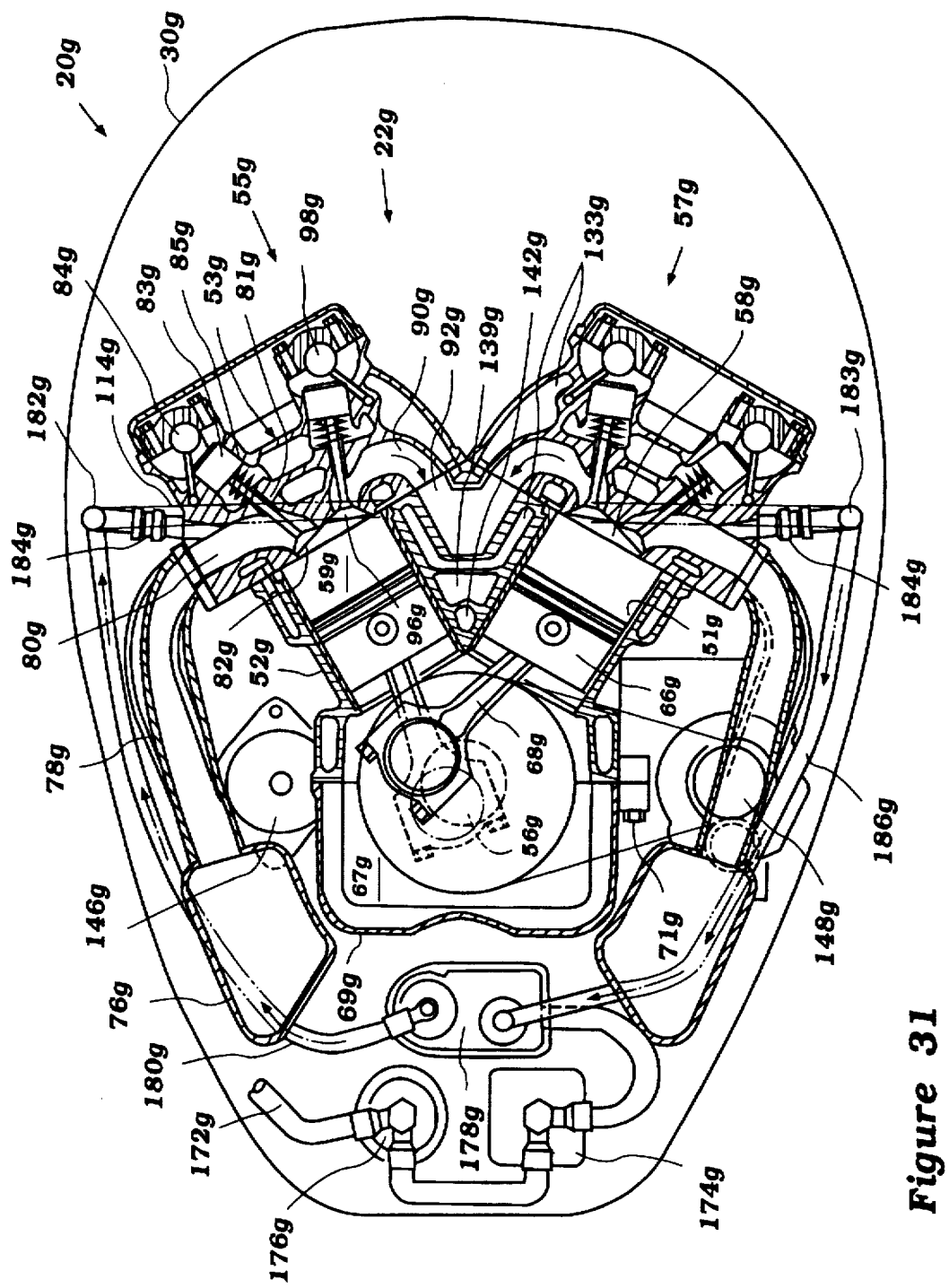
Figure 32:
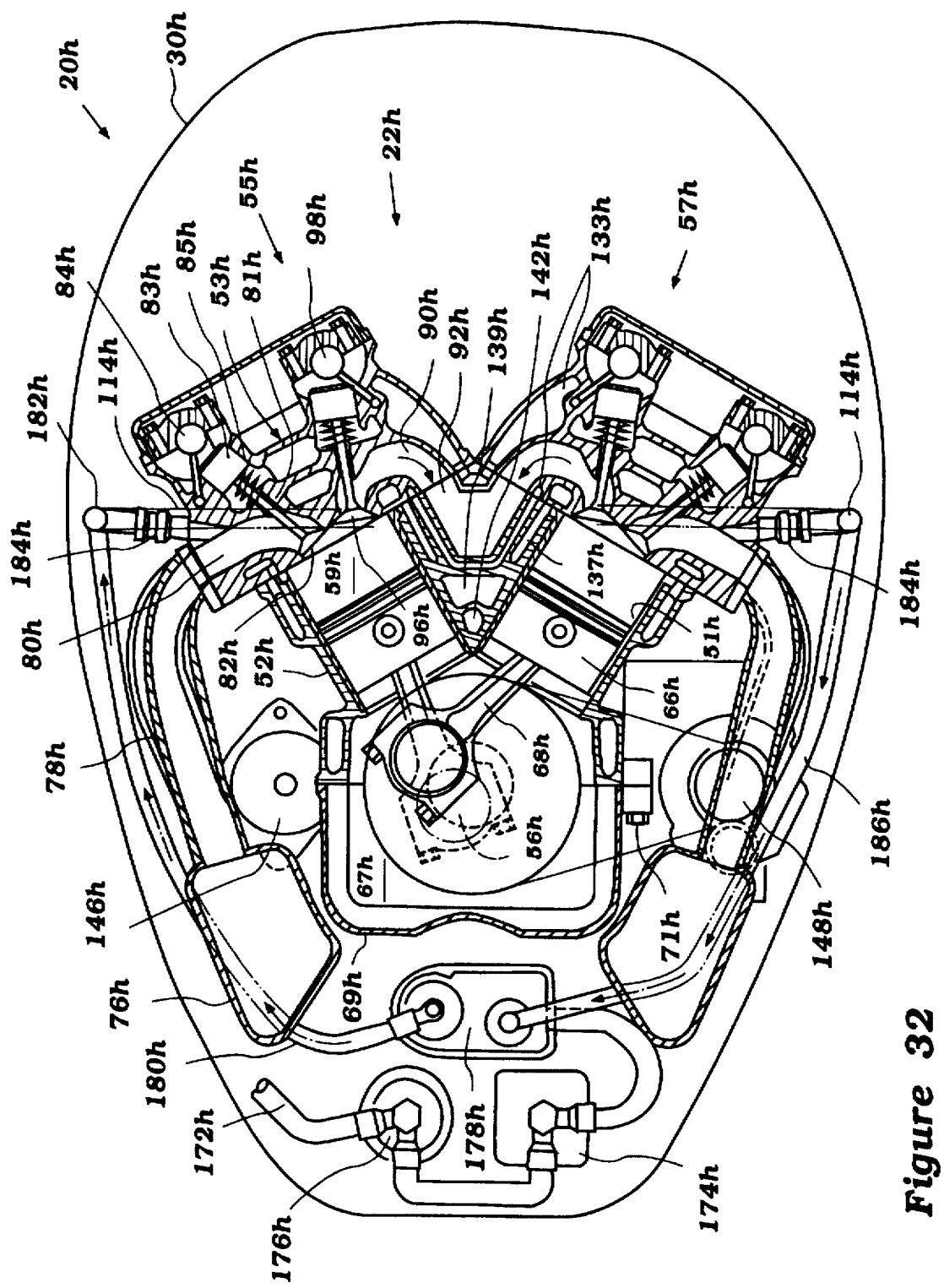
Figure 33:
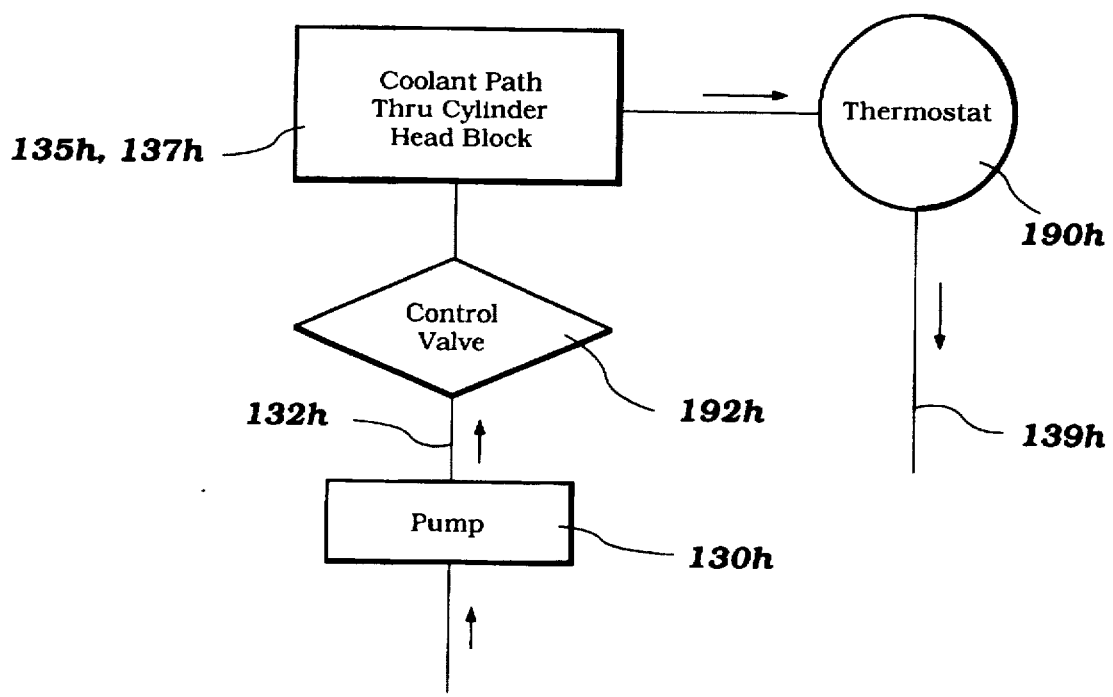

FIG. 7 is a first side view, in partial cross-section, of the engine illustrated in FIG. 1, illustrating an intake system thereof;

FIG. 8 is a front view of the engine of the motor illustrated in FIG. 1 illustrating the intake system;

FIG. 9 is a rear view of an engine of a motor having an exhaust system in accordance with a second embodiment of the present invention;

FIG. 10 is a cross-sectional side view of an engine of a motor having an exhaust system in accordance with a third embodiment of the present invention;

FIG. 11 is a rear view of the engine illustrated in FIG. 10;

FIG. 12(a) is an enlarged cross-sectional view of a connection between a portion of the engine illustrated in FIG. 10 and an exhaust guide of the motor;

FIG. 12(b) is a front view of the connection illustrated in FIG. 12(a);

FIG. 13 is a side view of an outboard motor powered by an engine, illustrated in phantom, and having an exhaust system in accordance with a fourth embodiment of the present invention;

FIG. 14 is a cross-sectional side view of the engine illustrated in FIG. 13;

FIG. 15 is a cross-sectional view of a middle portion of the motor illustrated in FIG. 13, including that portion of the engine therein;

FIG. 16 is a cross-sectional view of a lower portion of the motor illustrated in FIG. 13;

FIG. 17 is a cross-sectional top view of the engine illustrated in FIG. 13;

FIG. 18 is a rear view of the engine illustrated in FIG. 13 and illustrating the exhaust system thereof;

FIG. 19 is a cross-sectional view of a connection of a portion of the engine illustrated in FIG. 13 and an exhaust guide of the motor;

FIG. 20 is a cross-sectional top view of an engine of a motor having an exhaust system in accordance with a fifth embodiment of the present invention;

FIG. 21 is a cross-sectional side view of the engine illustrated in FIG. 20;

FIG. 22 is a cross-sectional top view of an engine of a motor having an exhaust system in accordance with a sixth embodiment of the present invention; FIG. 23 is a side view of an outboard motor powered by an engine illustrated in phantom, and having an exhaust system in accordance with a seventh embodiment of the present invention;

FIG. 24 is a cross-sectional side view of the engine illustrated in FIG. 23;

FIG. 25 is a cross-sectional view of a middle portion of the motor illustrated in FIG. 23;

FIG. 26 is a cross-sectional view of a lower portion of the motor illustrated in FIG. 23;

FIG. 27 is a cross-sectional top view of the engine illustrated in FIG. 23;

FIG. 28 is a rear view of the engine illustrated in FIG. 23, illustrating the exhaust system;

FIG. 29 is a side view, in partial cross-section, of the motor illustrated in FIG. 23, illustrating an intake system and a portion of a fuel system of the engine;

FIG. 30 is a front view of the engine illustrated in FIG. 23, illustrating an intake system and a portion of the fuel system thereof;

FIG. 31 is a cross-sectional top view of an engine of a motor having an exhaust system in accordance with an eighth embodiment of the present invention;

FIG. 32 is a cross-sectional top view of an engine of a motor having an exhaust system in accordance with a ninth embodiment of the present invention; and FIG. 33 is a coolant path flow diagram for the engine of the motor illustrated in FIG. 23.

DETAILED DESCRIPTION OF THE PREFERRED EMBODIMENTS OF THE INVENTION

In accordance with the present invention, there is provided an outboard motor 20 powered by an engine 22 and having an improved exhaust system in accordance with the present invention. In general, the exhaust system is arranged so that the outboard motor remains small in size, does not inhibit the flow of exhaust and does not affect the lubricating system detrimentally.

As illustrated in FIG. 1, the outboard motor 20 is of the type utilized to propel a watercraft 24. The outboard motor 20 has a powerhead area 26 comprised of a lower tray portion 28 and a main cowling portion 30. The motor 20 includes a lower unit 34 extending downwardly from the cowling portion 30. The lower unit 34 comprises an upper or "drive shaft housing" section 38 and a lower section 40.

The powerhead area 26 of the motor 20 is connected to a steering shaft (not shown). The steering shaft is supported for steering movement about a vertically extending axis within a swivel or steering bracket 44. The swivel bracket 44 is connected by means of a pivot pin 46 to a clamping bracket 48 which is attached to a transom portion 32 of a hull 36 of the watercraft 24. The pivot pin 46 permits the outboard motor 20 to be trimmed and tilted up about the horizontally disposed axis formed by the pivot pin 46.

Figure 2:
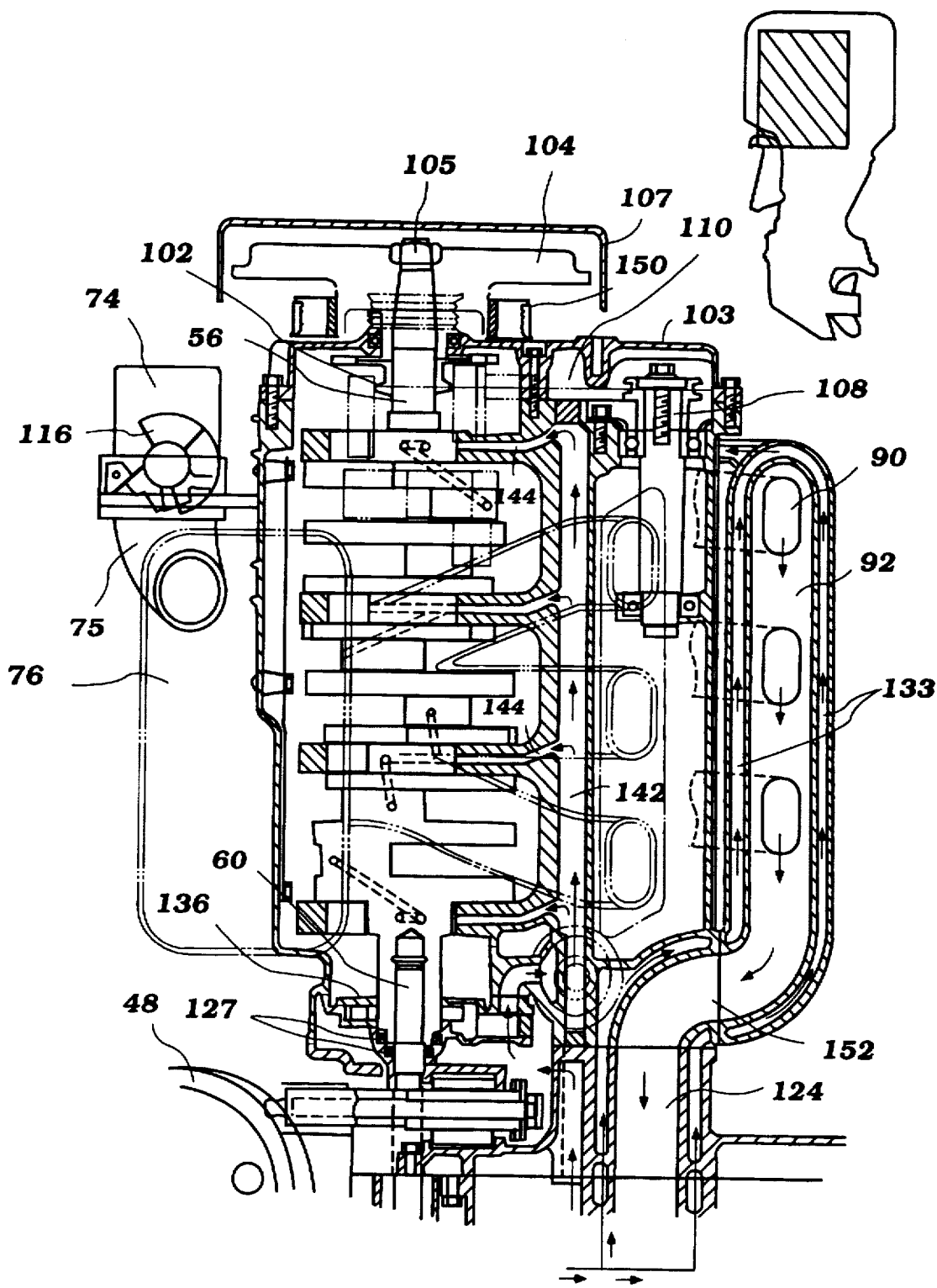
FIG. 2 is a cross-sectional side view of a portion of the engine of the motor illustrated in FIG. 1.
Figure 5:
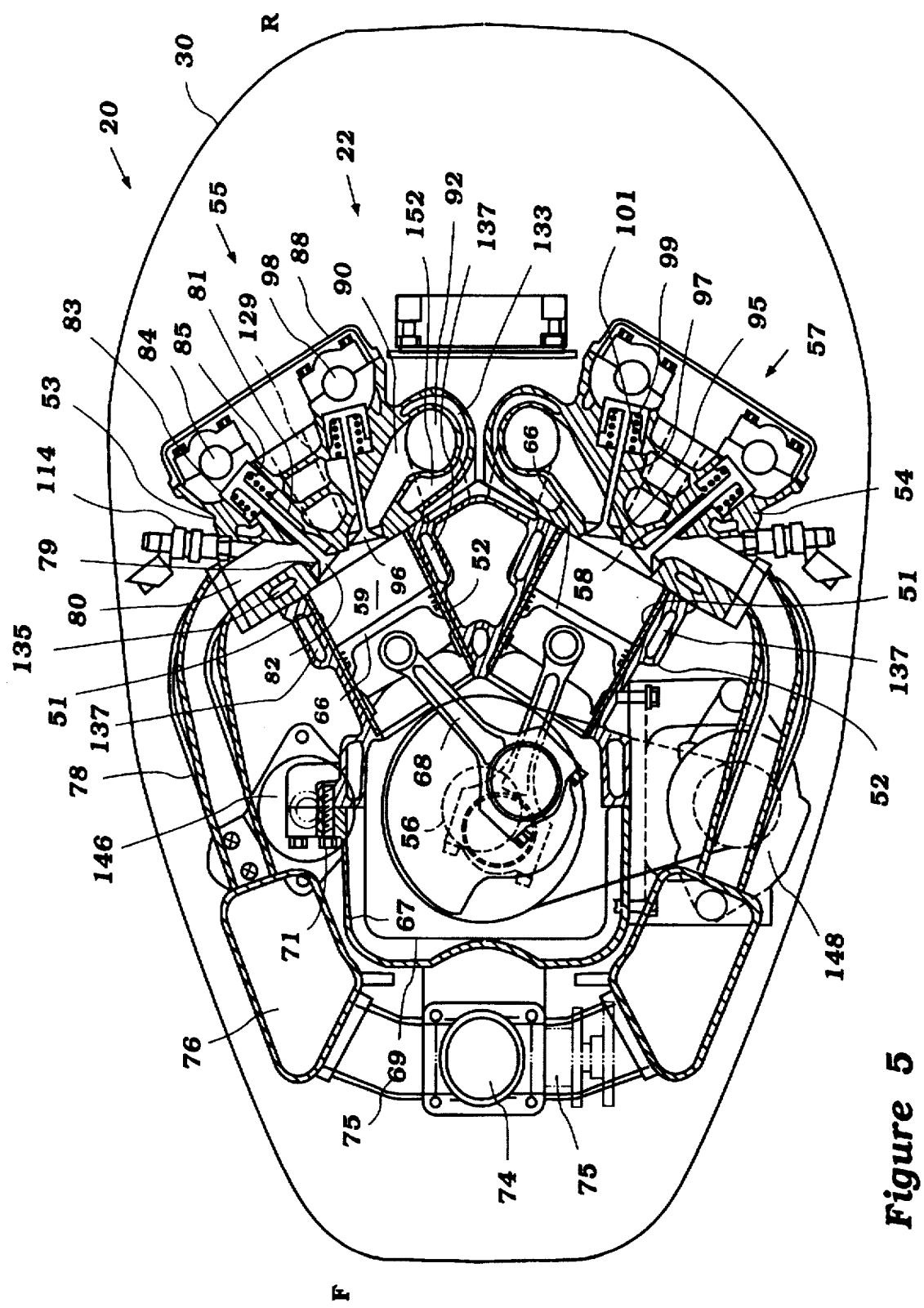
FIG. 5 is a cross-sectional top view of the engine of the motor illustrated in FIG. 1.

Referring to FIGS. 1, 2 and 5, the power head 26 of the outboard motor 20 includes the engine 22 which is positioned within the cowling portion 30. The engine 22 is preferably of the six-cylinder, four-cycle variety, and is arranged in a "V" fashion. In this arrangement, the engine 22 has a cylinder block 52 with a first cylinder head 53 and a second cylinder head 54 connected thereto and cooperating therewith to define first and second cylinder banks 55, 57. Each bank preferably defines three cylinders 59, each having a combustion chamber 58. As may be appreciated by those skilled in the art, the engine 22 may have a greater or lesser number of cylinders, such as two, four, or eight or more.

As illustrated in FIG. 5, a piston 66 is movably positioned in each cylinder 59, each cylinder lined with a cylinder sleeve 51. Each piston 66 is connected to a connecting rod 68 extending to a vertically extending (i.e. along a vertical axis "V" as illustrated in FIG. 1) crankshaft 56. Referring to FIG. 2, the crankshaft 56 is connected to a top end 65 of a drive shaft 60 which extends downwardly through the lower unit 34, where it drives a bevel gear and a conventional forward-neutral-reverse transmission 61. A control (not shown) is preferably provided for allowing an operator to remotely control the transmission from the watercraft 24.

The transmission drives a propeller shaft 63 which is journalled within the lower section 40 of the lower unit 34 in a known manner. A hub 62 of a propeller 64 is coupled to the propeller shaft 63 for providing a propulsive force to the watercraft 24 in a manner well known in this art.

The crankshaft 56 is journalled for rotation with respect to the cylinder block 52. A crankcase cover 67 engages an end of the block 52, defining therewith a crankcase chamber 69 within which the crankshaft rotates. The crankcase cover 67 may be attached to the cyclinder block 52 by bolts 71 or similar means for attaching known to those skilled in the art.

The engine 22 includes an air intake system 72 for providing air to each combustion chamber 58. As illustrated in FIGS. 1 and 2, air passes through the vent (not shown) in the motor cowling 30 and through an air plenum to a main intake pipe 74. Pipes 75 lead from the main intake pipe 74 to first and second surge tanks 76 having branches 78 extending therefrom. Preferably, each surge tank 76 has a three branches 78 extending therefrom, one for each cylinder 59 in a bank. Each branch 78 extends to a passage 80 in the cylinder head 53,54 to one of the combustion chambers 58.

Referring still to FIG. 5, means are provided for controlling the flow of air into each combustion chamber 58. Preferably, this means comprises at least one intake valve 82 corresponding to each intake passage 80. As illustrated, all of the intake valves 82 for each bank of cylinders are preferably actuated by a single intake camshaft 84. The intake camshaft 84 is mounted for rotation with respect to its respective cylinder head 53,54 and connected thereto with at least one bracket. Each intake camshaft 84 rotates within an enclosure defined by the respective cylinder head 54, 55 and a camshaft cover 88 connected thereto.

In particular, each valve 82 has a head which is adapted for seating against a valve seal 79 in the passage 80, and a stem extending from the head through a valve guide 81 to a follower 83. A spring 85 is positioned between the follower 83 and a portion of the cylinder head 53, 54 for biasing the valve 82 upwardly into a closed position.

An exhaust system is provided for routing the products of combustion within the combustion chambers 58 to a point external to the engine 22. In particular, an exhaust passage 90 leads from each combustion chamber to a passage 92. The remainder of the exhaust system is described in more detail below.

Referring still to FIG. 5, means are also provided for controlling the flow of exhaust from each combustion chamber 58 to its respective exhaust passage 90. Preferably, this means comprises at least one exhaust valve 96. Like the intake valves 82, the exhaust valves 96 of each cylinder bank are preferably all actuated by a single exhaust camshaft 98. Each exhaust camshaft 98 is journalled for rotation with respect to its respective cylinder head 54,55 and connected thereto with at least one bracket. Each exhaust camshaft 98 is enclosed within the camshaft cover 88.

As with the intake valve 82, each exhaust valve 96 preferably includes a head for selective positioning against a valve seat 95 in the passage 90. A stem extends from the head of the valve 96 through a valve guide 97 in the cylinder head 53, 54. A follower 99 is positioned at the opposite end of the stem for engagement by the camshaft 98. A spring 101 is positioned between the follower 99 and the cylinder head 53, 54 for biasing the valve 96 into its closed position.

As best illustrated in FIGS. 1 and 2, means are provided for driving the camshafts 84, 98. Preferably, a toothed gear 102 is mounted near a top end of the crankshaft 56 positioned within a chamber formed by the cylinder block 52 and a timing chain cover 103, and just below a flywheel 104 also positioned on the crankshaft 56. An exhaust camshaft gear (not shown) is positioned on each exhaust camshaft 98, and an intake camshaft gear (not shown) is positioned on each intake camshaft 84. A timing chain 110 extends around the timing belt pulley 102 and the exhaust and intake camshaft gears corresponding to the cylinder banks. By this arrangement, the camshaft 56 indirectly drives the camshafts 84, 98. One or more idler gears 108 may be provided for routing the chain.

The flywheel 104 is preferably maintained in position on the end of the crankshaft 56 with a nut 105. The flywheel 104 is preferably positioned under a flywheel cover 107.

As best illustrated in FIG. 1, an exhaust guide 122 is positioned at the bottom end of the engine 22. The exhaust guide 122 has a passage 124 extending therethrough which communicates with the exhaust passages 92 in a manner described in more detail below. An exhaust pipe 126 is connected to the bottom side of the exhaust guide 122 in alignment with the passage 124. The exhaust pipe 126 terminates within a chamber of a muffler 128.

Figure 3:
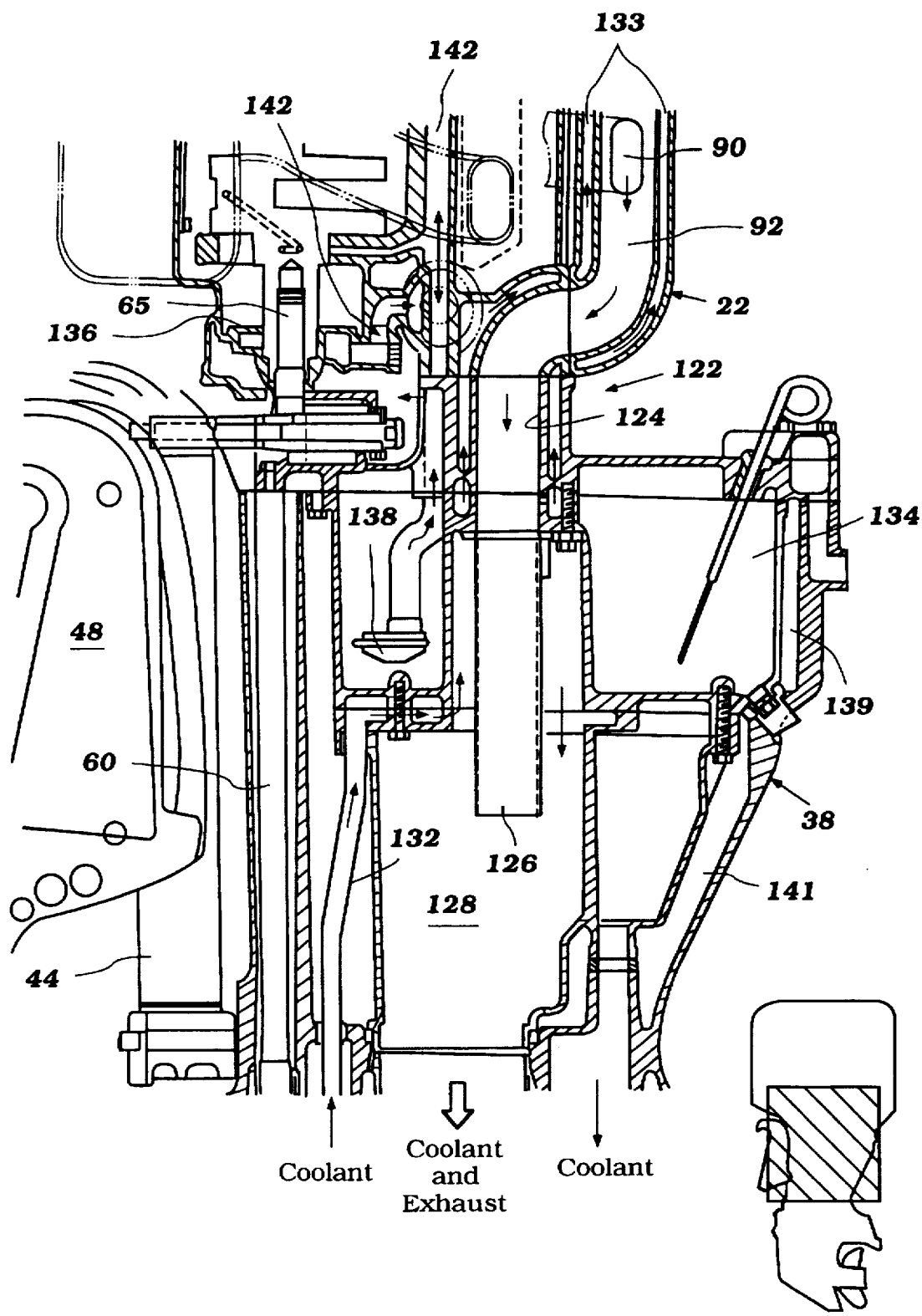
FIG. 3 is a cross-sectional view of a portion of the engine and a middle portion of the motor illustrated in FIG. 1 and that portion of the engine therein.
Figure 4:
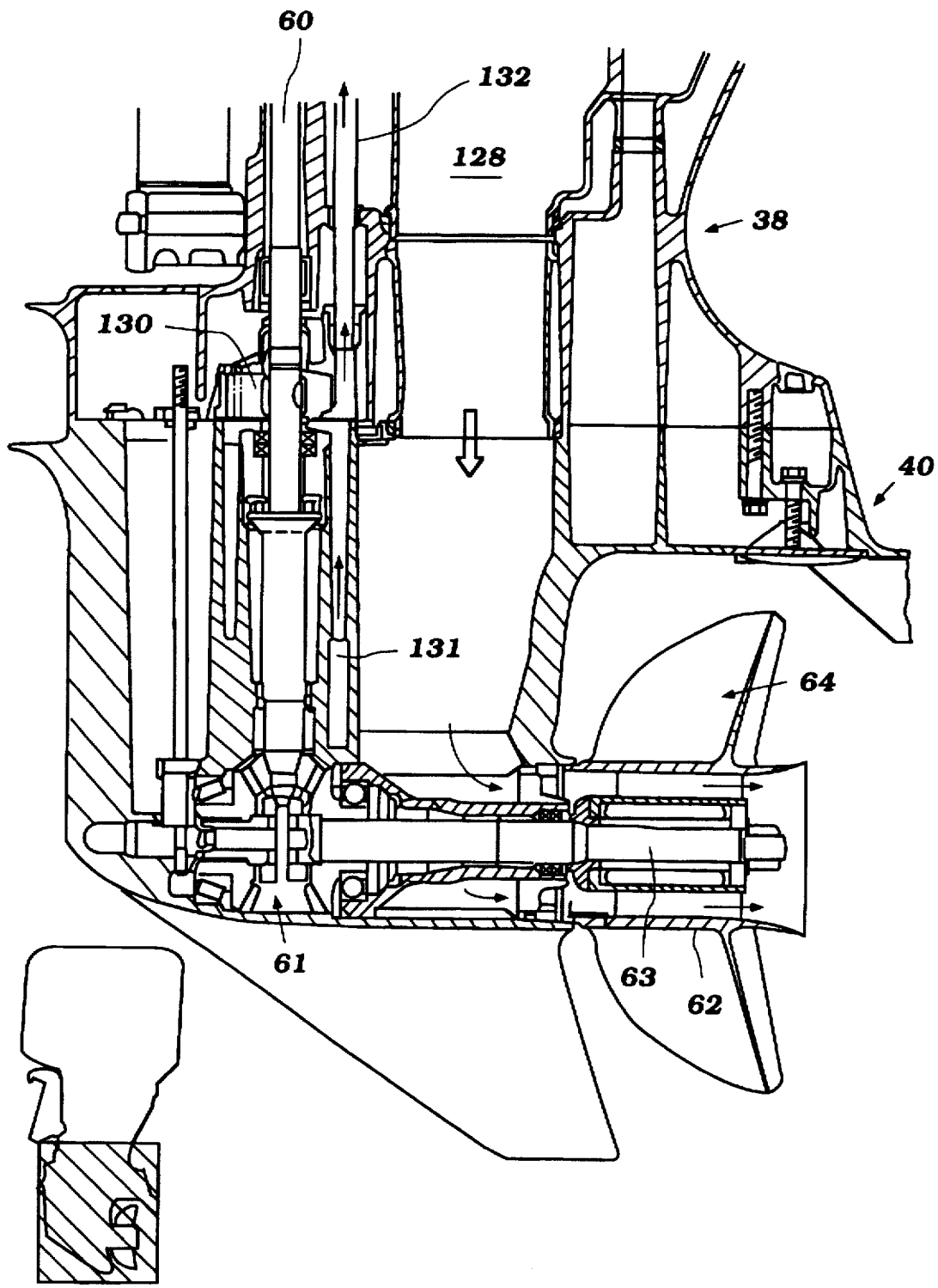
FIG. 4 is a cross-sectional view of a lower portion of the motor illustrated in FIG. 1, illustrating a propeller thereof.

Referring also to FIG. 3, the muffler 128 is positioned within the lower unit 34 and between the drive shaft 60 and a cooling liquid return. An exhaust gas outlet is provided in the bottom end of the muffler 128, through which the exhaust gas is routed (in the direction of arrows "E") through the hub 62 of the propeller 64 to a point external of the motor 20, as best illustrated in FIG. 4.

A fuel delivery system is provided for delivering fuel to each combustion chamber 58 for combustion therein. The fuel delivery system preferably includes a fuel tank (not shown) and a fuel pump (not shown) for pumping fuel from the tank and delivering it to each combustion chamber 58. Preferably, the fuel is injected into the air stream flowing through each passage 80 with a fuel injector 114 (see FIG. 5).

As best illustrated in FIG. 2, a throttle 116 is provided for controlling the flow of air into the combustion chambers 58. Preferably, the throttle 116 comprises a moveable plate positioned within air intake pipe 74. The throttle 1 16 is preferably controlled through a cable by the operator of the watercraft.

A suitable ignition system is provided for igniting an air and fuel mixture within each combustion chamber 58. Such systems are well known to those skilled in the art, and as the ignition system forms no part of the present invention, such is not described in detail herein. The ignition system may include a spark plug for use in igniting the air and fuel mixture within each combustion chamber 58. A mounting hole or bore 129 is provided in the cylinder head 53, 54 corresponding to each combustion chamber 58 for the spark plug.

A cooling system is provided for cooling the engine 22. Referring to FIG. 1, cooling liquid, preferably water from the body of water in which the motor 22 is positioned, is pumped by a water pump 130 positioned in the lower unit 34 through a water inlet 131. The pump 130 is preferably driven by the drive shaft 60, and expels the cooling liquid upwardly through a cooling liquid pipe 132. This cooling liquid passes into a cooling jacket 133 surrounding the exhaust passages 92 (FIG. 2) and then is guided into a number of cooling liquid passages 135 throughout the cylinder heads 53, 54 (FIG. 5) and then to coolant jackets 137 around the cylinders 59 in the cylinder block 52.

The cooling liquid is preferably routed to a generally vertically extending return passage 139 through the cylinder block 52 (illustrated schematically in FIG. 1), for draining the cooling liquid to the bottom of the engine 22. The coolant is then split. A first amount of coolant is directed to a coolant pool 140 surrounding an oil reservoir or pan 134, and another pool 141 near the muffler 128. When the liquid level in the pool 141 becomes to high, the cooling liquid runs over an overflow ledge or weir to a passage leading to a drain. The cooling liquid diverted to the drain is discharged from the motor.

The remaining amount of coolant is directed around the exhaust pipe 126 for cooling it. This coolant then flows into the muffler 128, where it is mixed with the exhaust gas. The coolant is carried with the exhaust gas through the propeller hub 62 discharge back to the body of water.

A thermostat (not shown) may be provided for selectively controlling the flow of cooling liquid through one or more portions of the engine 22, as known to those skilled in the art. In addition, a pressure relief valve (not shown) may be provided for diverting cooling liquid from the engine in the event the cooling liquid pressure exceeds a predetermined amount.

Preferably, the engine 22 includes a lubricating system for providing lubricant to the various portions of the engine in accordance with the present invention. As illustrated in FIGS. 2 and 3, the lubricating system includes the oil reservoir 134 positioned below the engine 22. The reservoir 134 is in communication with an oil pump 136 via a suction tube 138. The oil pump is drivingly positioned on the end of the crankshaft 56 at the bottom of the engine 22. Seals 127 are provided for sealing the oil pump with respect to the remainder of the engine 22. The oil pump draws lubricant from the reservoir 134 and then delivers it through a connecting passage 140 and on to a main gallery 142. Branch passages 144 extend from the main gallery 142 for providing lubricant to crankshaft bearings and the like.

The engine 22 may include additional features such as a starter motor 146 and an alternator 148. Preferably, the starter motor 146 is positioned for engagement with the flywheel 104 for use in starting the engine 22, as is well known to those skilled in the art.

The alternator 148 is preferably utilized to produce electricity for firing the spark plugs and similar functions. The alternator 148 is run by a belt 150 which is driven by a pulley mounted on the end of the crankshaft 56 just below the flywheel 104, as best illustrated in FIG. 2.

The motor 20 includes an improved exhaust system in accordance with the present invention. As disclosed above, exhaust is routed through a passage 90 from each cylinder 59 in a cylinder head 53, 54 to a main exhaust passage 92 corresponding to each bank 55, 57. Thus, there are two passages 92, one for each bank 55, 57.

Figure 6:
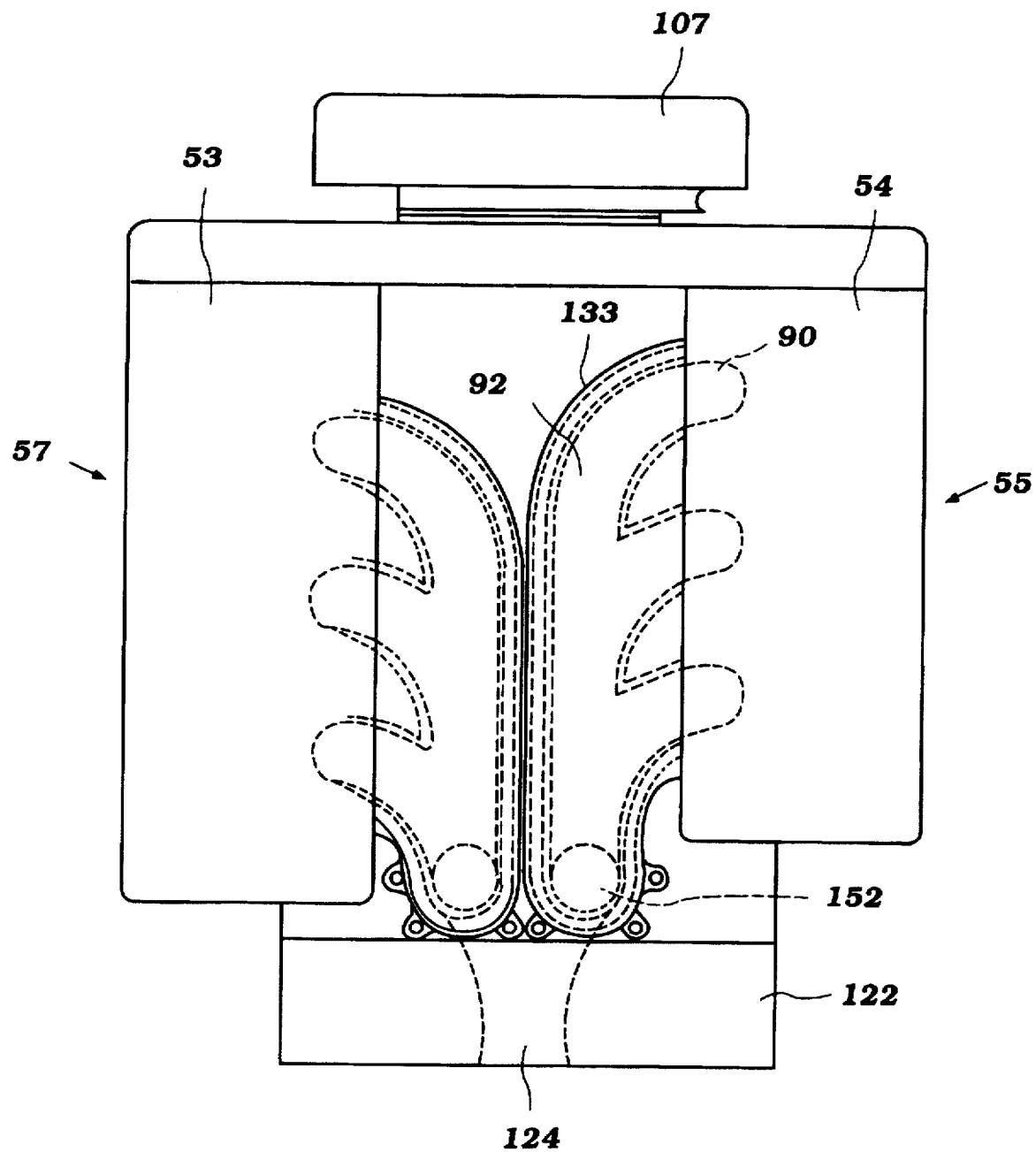
FIG. 6 is a rear view of the engine of the motor illustrated in FIG. 1, illustrating an exhaust arrangement thereof.

As best illustrated in FIG. 6, each passage 92 is positioned within a portion of the cylinder head 53, 55 which extends outwardly into the valley generally between the cylinder banks. The passage 92 joins with each passage 90 (each of which extends in the direction of the valley) corresponding to its respective bank 55, 57, and extends generally vertically downward through the valley, with its respective head 53, 54.

At the bottom of the engine 22, the passages 92 extend to a generally horizontal exhaust passage portion 152. The generally horizontal exhaust passage portions 152 corresponding to the exhaust system of each bank 55, 57 then merge and lead to the singular passage 124 through the exhaust guide 122.

FIG. 9 illustrates a second exhaust arrangement in accordance with the present invention. This arrangement is somewhat similar to the embodiment described above, and in the description and illustration of this embodiment, like parts have been given like numerals to those utilized in the description and illustration of the embodiment above, except that an "a" designator has been added thereto.

In this arrangement, the main exhaust passage 92a corresponding to each bank 55a, 57a is generally "E"-shaped, having legs extending outwardly to each passage 90a from the respective cylinders in its bank. The generally horizontal exhaust passage portion 152a extends from a center portion of the main exhaust passage 92a. These passages 152a extend into the valley between the banks and join at a single main passage 154a which extends through the valley to the bottom of the engine. There, the single passage 154a joins the passage 124a through the exhaust guide 122a.

FIGS. 10 and 11 illustrate a third exhaust arrangement or embodiment in accordance with the present invention. This arrangement is somewhat similar to the embodiments described above, and in the description and illustration of this embodiment, like parts have been given like numerals to those utilized in the description and illustration of the embodiments above, except that a "b" designator has been added thereto.

This arrangement is similar to that illustrated in FIGS. 1–8, in that the main exhaust passages 92b extend generally vertically downward through the valley to the bottom of the engine. In this case, however, each passage 92b joins a passage 124b through the exhaust guide 122b (i.e. there are two passages 124b). Then, the exhaust pipe 126b is generally "T"-shaped. At its top end, each branch of the "T" of the exhaust pipe 126b extends to one of the passages 124b. The exhaust pipe 126b accumulates the exhaust from each passage 124b and routed it through a single passage into the muffler.

FIGS. 12(a) and 12(b) illustrate a particular arrangement for joining the exhaust passages 92b to the passages 124b through the exhaust guide 122b, and for permitting coolant to flow from the supply pipe 132b into the cooling jacket 133b.

As illustrated, a wall portion of each cylinder head 53b, 54b defining the exhaust passage 92b extends to meet an upwardly extending collar member 155b attached to the exhaust guide 122b defining the exhaust passage 124b. To provide a sealing arrangement between these two parts or walls, a rubber sleeve 156b flexible hose or similar member extends around the outside of each wall portion and across the gap between the two members. A steel band 158b extends around the outside of the sleeve 156b at its top and bottom, the band tightened thereabout with at least one fastener 160b. Of course, similar means may be provided for sealingly joining the two exhaust passages 92c, 124c, as may be contemplated by those skilled in the art.

Similarly, another wall portion of the cylinder head 53b, 54b extends to meet a mating collar member 150b attached to the exhaust guide 122b (this collar 159b having a larger diameter than the other collar 155b, and therefore extending about the outside of the first collar 155b). A flexible rubber sleeve 157b extends around the outside of these wall portions at their junction, thus providing a closed fluid path from the supply pipe 132b into a passage 162b in the exhaust guide 122b, and thereon into the coolant jacket 133b.

FIGS. 13–19 illustrate a fourth embodiment exhaust arrangement in accordance with the present invention. This arrangement is somewhat similar to the embodiments described above, and in the description and illustration of this embodiment, like parts have been given like numerals to those utilized in the description and illustration of the embodiments above, except that a "c" designator has been added thereto.

In this embodiment, the exhaust passages 90c lead from each combustion chamber 58c through the cylinder head 53c, 54c to an exhaust manifold 164c. The exhaust manifold 164c has branch passages 92c which extend from a main passage 166c. A branch passage 92c extends from the main passage 166c to meet a corresponding passage 90c.

Preferably, the exhaust manifold 164c connects or joins to the cylinder heads 53c, 54c at a mounting surface "M" as illustrated in FIG. 17. In this embodiment, the mounting surfaces "M" corresponding to the mounting of the exhaust manifold 164c to each head 53d, 54d are in a common plane. As illustrated in FIG. 18, one or more bolts 168c are utilized to connect the exhaust manifold 164c to the heads 53c, 54c.

The connection of the lower end of the manifold 164c to the exhaust guide 122c is best illustrated in FIGS. 18 and 19. Preferably, a flexible connection is provided between the exhaust guide 122b and exhaust manifold 164c in a manner similar to that illustrated in FIGS. 12(a) and 12(b), as illustrated in FIG. 19.

FIGS. 20 and 21 illustrate a fifth embodiment exhaust arrangement in accordance with the present invention. This arrangement is somewhat similar to the embodiments described above, and in the description and illustration of this embodiment, like parts have been given like numerals to those utilized in the description and illustration of the embodiments above, except that a "d" designator has been added thereto.

This arrangement is very similar to the last embodiment illustrated in FIGS. 13–19. In this embodiment, however, the starter motor 146d is positioned in a space defined by the cylinder block 52d, cylinder heads 53d, 54d, and the exhaust manifold 164d. As illustrated, this space is somewhat diamond-shaped, and is generally in the "V" between the two cylinder banks 55d, 57d.

As in the prior embodiments, the starter motor 146d is positioned so that its drive gear is adjacent the flywheel 104d, whereby activation of the starter motor 146d serves to start the engine 22d, as best illustrated in FIG. 21.

While the starter motor 146d is preferably positioned in this space, other engine accessories may suitably be positioned there as may be appreciated by those skilled in the art.

FIG. 22 illustrates a sixth embodiment exhaust arrangement in accordance with the present invention. This arrangement is somewhat similar to the embodiments described above, and in the description and illustration of this embodiment, like parts have been given like numerals to those utilized in the description and illustration of the embodiments above, except that an "e" designator has been added thereto.

This embodiment is generally similar to that illustrated in FIGS. 13–19 as well. In this embodiment, however, the mounting surfaces "M" of the exhaust manifold 164e and cylinder heads 53e, 54e are not in the same or even parallel planes, as in the embodiment illustrated in FIG. 17. Instead, the mounting surfaces of the cylinder heads 53e, 54d generally face inwardly towards one another. In this manner, the mounting surfaces lie in planes which generally intersect one another in a "V" shape.

This arrangement allows the exhaust manifold 164d to sit deeper within the valley between the cylinder banks 55e, 57e. This serves to reduce the engine profile, allowing the outboard motor 20e to have a smaller outer dimension.

FIGS. 23–30 illustrate a seventh embodiment exhaust arrangement in accordance with the present invention. This arrangement is somewhat similar to the embodiments described above, and in the description and illustration of this embodiment, like parts have been given like numerals to those utilized in the description and illustration of the embodiments above, except that an "f" designator has been added thereto.

FIGS. 24 and 27–30 illustrate in detail a fuel system for use in supplying fuel to the engine 22f. In general, fuel is pumped from a fuel source, such as a tank on board the watercraft 24f, through a supply line 172f by a low pressure pump 174f. This pump 174f may be of the diaphragm type.

Preferably, the pumped fuel is passed through a filter 176f positioned along the line 172f.

The fuel is delivered by the pump 174f to a vapor separator 178f. After separation of air from the fuel, a high pressure pump (not shown, but preferably positioned within the separator 178f) delivers fuel under high pressure to a high pressure fuel line 180f. This line 180f leads to a fuel rail 182f corresponding to a first cylinder bank 55f. A line 185f extends from the opposite end of this fuel rail 182f to a first end of a fuel rail 183f corresponding to the other cylinder bank 57f. Fuel passes from each rail 182f through a passage 184f extending therefrom to each fuel injector 114f.

Fuel which is supplied to the fuel rails 182f, 183f but not delivered by the injectors 114f is returned to the vapor separator 178f through a return line 186f extending from the fuel rail 183f.

Also illustrated diagramatically is the coolant system for the engine 22f (see FIGS. 23 and 33). The coolant flows through the supply pipe 132f from the pump 130f to the coolant jacket 133a for cooling the areas of the engine 22f surrounding the exhaust passage 92f. Preferably, a pressure valve 188f is positioned along the coolant path after cooling the exhaust passage 92f. This pressure valve 188f is utilized to divert coolant through a relief passage 189f and thereon to the coolant drain system in the even the coolant pressure exceeds a predetermined high pressure.

A thermostat 190f is preferably positioned along the coolant path for monitoring the temperature of the coolant. A control valve 192f is also positioned along the coolant path preferably before the coolant passes through the cylinder block and heads 52, 53f, 54f of the engine 22f. The thermostat 190f is preferably positioned along the coolant path downstream of the passages 135f, 137f through the cylinder block and heads 52, 53f, 54f. The control valve 192f is controlled by the thermostat 190f, such that if the coolant temperature is high, the valve 192f is opened to allow coolant to flow though the engine 22f at a high rate. On the other hand, if the temperature of the coolant is low, then the valve 192f is closed, allowing the engine to warm up.

Referring to FIG. 27, an exhaust passage 90f extending through the cylinder head 53f, 54f from each combustion chamber 58f curves generally inward towards the valley between the cylinder banks 55f, 57f. The heads 53f, 54f and cylinder block 52f cooperate to define a generally "V" shaped main exhaust passage 92f which extends vertically down through the valley to the bottom of the engine 22f. This passage 92f leads to the passage 124f in the exhaust guide 122f.

In this arrangement, the main gallery 142f of the lubricating system preferably extends vertically through the portion of the cylinder block 52f positioned between the cylinder banks 55f, 57f and between the coolant return passage 139f.

So arranged, the coolant jacket 133f surrounding the exhaust passage 92f is positioned on each side thereof, part of the jacket 133f formed within the cylinder block 52f and part within each cylinder head 53f, 54f. The cylinder cooling jackets 137f are positioned within the walls of the cylinder block 52f adjacent the jacket 133f, but defined separately therefrom.

This particular arrangement permits the exhaust passage 92f to be quite large, so that the flow of exhaust is restricted little. At the same time, the positioning of the water return passage 139f between the exhaust passage 92f and the lubricant gallery 142f generally isolates the lubricant system from the high heat in the area surrounding the exhaust passage 92f.

FIG. 31 illustrates a eighth embodiment exhaust arrangement in accordance with the present invention. This arrangement is somewhat similar to the embodiments described above, and in the description and illustration of this embodiment, like parts have been given like numerals to those utilized in the description and illustration of the embodiments above, except that a "g" designator has been added thereto.

In this arrangement, the cylinder coolant jackets 137g in the cylinder block 52g are combined with the exhaust passage cooling jacket 133g into a single large "U"-shaped passage positioned between the cooling water return passage 139g and the exhaust passage 92g in the valley of the cylinder block 52g between the banks 55g, 57g. Because these two coolant paths are combined, they require less engine space. This permits the exhaust passage 92f to be enlarged as compared to the arrangement illustrated in FIG. 27.

FIG. 32 illustrates a ninth embodiment exhaust arrangement in accordance with the present invention. This arrangement is somewhat similar to the embodiments described above and in the description and illustration of this embodiment, like parts have been given like numerals to those utilized in the description and illustration of the embodiments above, except that an "h" designator has been added thereto.

This arrangement is similar to that illustrated in FIG. 27 except that the cylinder liners or sleeves (51f in that Figure) have been removed. Instead, the inside surface of each cylinder 50h is plated with a durable material. This plating has a cross-sectional thickness which is much less than the thickness of the sleeve.

By removing the sleeves, the cylinder block walls in the inside of the "V" may be made thinner, and thus the space within the "V" made larger. This permits the exhaust passage 92h to be much larger in cross-sectional dimension, reducing exhaust backpressure.

In each embodiment disclosed, an exhaust system is provided which permits the engine and thus the outboard motor, to retain a small profile. This is primarily accomplished by locating one or more exhaust passages with the valley between the cylinder banks of the engine. At the same time, the exhaust passages are not restricted, so that exhaust back-pressure is minimized. Also, the exhaust system is arranged to prevent overheating of the lubricating system.

Of course, the foregoing description is that of preferred embodiments of the invention, and various changes and modifications may be made without departing from the spirit and scope of the invention, as defined by the appended claims.

What is claimed is:

1. An outboard motor comprised of a power head containing an internal combustion engine surrounded by a protective cowling, a driveshaft housing and lower unit depending from said power head and containing a propulsion device for propelling an associated watercraft, a transmission contained in said driveshaft housing and lower unit for driving said propulsion device from said engine, said engine having a cylinder block having a first cylinder head connected thereto and cooperating therewith to define a first cylinder bank containing at least one cylinder and a second cylinder head connected thereto and cooperating therewith to define a second cylinder bank containing at least one cylinder, said first and second banks arranged generally in a vertically extending "V" shape and defining a vertically extending valley therebetween, an exhaust system for discharging exhaust gasses from said engine to the atmosphere at least in part through said driveshaft housing and lower unit said exhaust system including at least one exhaust passage extending from each cylinder through its respective cylinder head towards said valley and a vertically extending exhaust manifold in said valley for collecting exhaust gasses from said exhaust passages said exhaust manifold terminating in a single downwardly extending discharge passage extending into said driveshaft housing and lower unit, an exhaust cooling jacket surrounding said single discharge passage and said exhaust manifold, an engine body cooling jacket formed in said cylinder heads and said cylinder block, and means for delivering cooling water from the body of water in which the associated watercraft is operating first to said exhaust cooling jacket and from said exhaust cooling jacket to said engine body cooling jacket.

2. The exhaust system in accordance with claim 1, wherein there is a separate exhaust manifold associated with each cylinder bank, each of said exhaust manifolds having a collector section terminating at a common outlet formed.

3. The exhaust system in accordance with claim 1, wherein there is a separate exhaust manifold associated with each cylinder bank, each of said exhaust manifolds having a collector section terminating at a common outlet formed near a vertical midpoint of said engine.

4. The exhaust system in accordance with claim 1, wherein said engine is supported upon an exhaust guide, said exhaust guide having an exhaust passage therethrough leading from said discharge passage.

5. The exhaust system in accordance with claim 4, wherein said single passage is connected to said exhaust guide via at flexible hose.

6. The exhaust system in accordance with claim 1, wherein there is a separate exhaust manifold associated with each cylinder bank, each of said exhaust manifolds having a collector section terminating at a common outlet, said engine is supported upon a top of an exhaust guide, said exhaust guide having a pair of passages therethrough, each exhaust common outlet leading to a respective one of said pair of passages through said exhaust guide.

7. The exhaust system in accordance with claim 6, wherein an exhaust pipe extends from a bottom of said exhaust guide, said exhaust pipe having a first branch connected to one of said pair of passages through said exhaust guide and a second branch connected to said other of said pair of passages, said branches merging into a single passage.

8. An exhaust system for an engine having a cylinder block having a first cylinder head connected thereto and cooperating therewith to define a first cylinder bank containing at least one cylinder and a second cylinder head connected thereto and cooperating therewith to define a second cylinder bank containing at least one cylinder, said first and second banks arranged generally in a "V" shape and having a valley therebetween, a main exhaust passage positioned within an exhaust manifold connected to said engine and extending through said valley to an end of said engine, at least one passage extending from each cylinder through its respective cylinder head inwardly to said exhaust manifold and a starter motor is position in a space between said exhaust manifold and said engine.

9. The exhaust system in accordance with claim 8, wherein a passage is defined through said manifold from each exhaust passage leading from a combustion chamber to said main exhaust passage.

10. The exhaust system in accordance with claim 8, wherein each cylinder head has an exhaust manifold mounting surface to which said manifold is mounted, said surfaces extending in generally parallel planes.

11. The exhaust system for an engine having a cylinder block having a first cylinder head connected thereto and cooperating therewith to define a first cylinder bank containing at least one cylinder and a second cylinder head connected thereto and cooperating therewith to define a second cylinder bank containing at least one cylinder, said first and second banks arranged generally in a "V" shape and having a valley therebetween, a main exhaust passage defined within said valley by said cylinder heads and cylinder block and extending through said valley to an end of said engine and at least one passage extending from each cylinder through its respective cylinder head inwardly to said main exhaust passage, said engine including a lubricant passage and a coolant passage extending through said valley, said coolant passage Hug positioned between said lubricant passage and said main exhaust passage.

12. The exhaust system for an engine having a cylinder block having a first cylinder head connected thereto and cooperating therewith to define a first cylinder bank containing at least one cylinder and a second cylinder head connected thereto and cooperating therewith to define a second cylinder bank containing at least one cylinder said first and second banks arranged generally in a "V" shape and having a valley therebetween, a main exhaust passage defined within said valley by said cylinder heads and cylinder block and extending through said valley to an end of said engine and at least one passage extending from each cylinder through its respective cylinder head inwardly to said main exhaust passage, a coolant jacket extending about said exhaust passage, a coolant passage positioned within said cylinder block adjacent each combustion chamber, and at least one oil passage extending through said valley generally parallel to said main exhaust passage, said coolant jacket and coolant passage extending between said at least one oil passage and said exhaust passage.

* * * * *

UNITED STATES PATENT AND TRADEMARK OFFICE
CERTIFICATE OF CORRECTION

PATENT NO.    : 5,893,783
DATED         : April 13, 1999
INVENTOR(S)   : Hiraoka et al.

It is certified that error appears in the above-identified patent and that said Letters Patent is hereby corrected as shown below:

Column 12,
Line 20, "formed." should be -- formed at the lower end of said engine. --

Column 13,
Line 17, "passage Hug positioned" should be -- passage being positioned --

Signed and Sealed this

Twenty-first Day of August, 2001

*Attest:*

*Attesting Officer*

NICHOLAS P. GODICI
*Acting Director of the United States Patent and Trademark Office*